US010994697B2

(12) United States Patent
Jessup et al.

(10) Patent No.: US 10,994,697 B2
(45) Date of Patent: May 4, 2021

(54) RESTRAINT SYSTEM FOR AN OCCUPANT SEAT MOUNTED IN A MOTOR VEHICLE

(71) Applicant: Indiana Mills & Manufacturing, Inc., Westfield, IN (US)

(72) Inventors: Chris P. Jessup, Sheridan, IN (US); Mark F. Henderson, Kokomo, IN (US); Norman C. Taylor, Noblesville, IN (US); Ryan A. Qualizza, Carmel, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 99 days.

(21) Appl. No.: 16/116,673

(22) Filed: Aug. 29, 2018

(65) Prior Publication Data

US 2019/0061683 A1 Feb. 28, 2019

Related U.S. Application Data

(60) Provisional application No. 62/552,611, filed on Aug. 31, 2017.

(51) Int. Cl.
*B60R 22/48* (2006.01)
*B60R 22/22* (2006.01)
(Continued)

(52) U.S. Cl.
CPC ............ *B60R 22/48* (2013.01); *B60Q 9/00* (2013.01); *B60R 22/22* (2013.01); *B60R 22/26* (2013.01); *G01D 5/245* (2013.01); *G08C 17/02* (2013.01); *B60R 21/01516* (2014.10); *B60R 21/01546* (2014.10); *B60R 21/01548* (2014.10); *B60R 2021/01286* (2013.01); *B60R 2022/1806* (2013.01); *B60R 2022/4816* (2013.01);
(Continued)

(58) Field of Classification Search
CPC ......... B60R 22/48; B60R 22/22; B60R 22/26; B60R 21/01516; B60R 21/01546; B60R 21/01548; B60R 2021/01286; B60R 2022/1806; B60R 2022/4816; B60R 2022/4825; B60R 2022/4866; B60R 2022/4891; B60Q 9/00; G01D 5/245; G08C 17/02
See application file for complete search history.

(56) References Cited

U.S. PATENT DOCUMENTS 3,340,523 A 9/1967 Whitman
3,449,714 A 6/1969 Farley, Jr.
(Continued)

*Primary Examiner* — Navid Ziaeianmehdizadeh
*Assistant Examiner* — Sean P Quinn
(74) *Attorney, Agent, or Firm* — Barnes & Thornburg LLP

(57) ABSTRACT

A restraint system for an occupant seat mounted in a motor vehicle includes a processor to produce at least one control signal to control either or both of an electronically controllable unit to disable or impede operation of the motor vehicle and a notification device to produce a notification unless, in sequence, a first sensor produces a first signal indicating detection of an occupant being seated in the occupant seat followed by at least one second sensor producing least one second signal indicating that a rotatable shaft of a web retractor coupled to a web of a restraint harness has rotated by at least a threshold amount followed by a third sensor producing a third signal indicating that a tongue of the restraint system is engaged with a buckle of the restraint system.

24 Claims, 19 Drawing Sheets

(51) Int. Cl.

| | | |
|---|---|---|
| *B60Q 9/00* | (2006.01) | |
| *G08C 17/02* | (2006.01) | |
| *G01D 5/245* | (2006.01) | |
| *B60R 22/26* | (2006.01) | |
| *B60R 21/01* | (2006.01) | |
| *B60R 21/015* | (2006.01) | |
| *B60R 22/18* | (2006.01) | |

(52) U.S. Cl.
CPC .............. *B60R 2022/4825* (2013.01); *B60R 2022/4866* (2013.01); *B60R 2022/4891* (2013.01)

(56) References Cited

U.S. PATENT DOCUMENTS

| | | | |
|---|---|---|---|
| 3,455,410 A | 7/1969 | Wilson | |
| 3,757,293 A | 9/1973 | Petersen, III | |
| 3,777,180 A | 12/1973 | Carlson | |
| 3,798,551 A | 3/1974 | Cake | |
| 3,860,904 A | 1/1975 | Andersen | |
| 3,876,974 A | 4/1975 | Yustick | |
| 5,883,441 A | 3/1999 | Shoemaker | |
| 6,135,230 A * | 10/2000 | Schenck | B60K 28/04 180/269 |
| 6,215,395 B1 | 4/2001 | Slaughter et al. | |
| 8,285,455 B2 | 10/2012 | Inayoshi et al. | |
| 9,266,500 B2 | 2/2016 | Brand et al. | |
| 9,555,722 B2 | 1/2017 | Fujii | |
| 10,569,737 B2 | 2/2020 | Kleinert et al. | |
| 2003/0075969 A1 | 4/2003 | Fromme et al. | |
| 2005/0200466 A1 | 9/2005 | Amemiya | |
| 2007/0285219 A1* | 12/2007 | Greene | B60R 22/48 340/457.1 |
| 2014/0188347 A1* | 7/2014 | Tabe | B60R 21/0152 701/45 |
| 2015/0251618 A1* | 9/2015 | Ghannam | B60R 22/48 340/457.1 |
| 2017/0129399 A1* | 5/2017 | Appukutty | B60N 2/2872 |
| 2018/0222441 A1* | 8/2018 | Koase | B60R 22/48 |

* cited by examiner

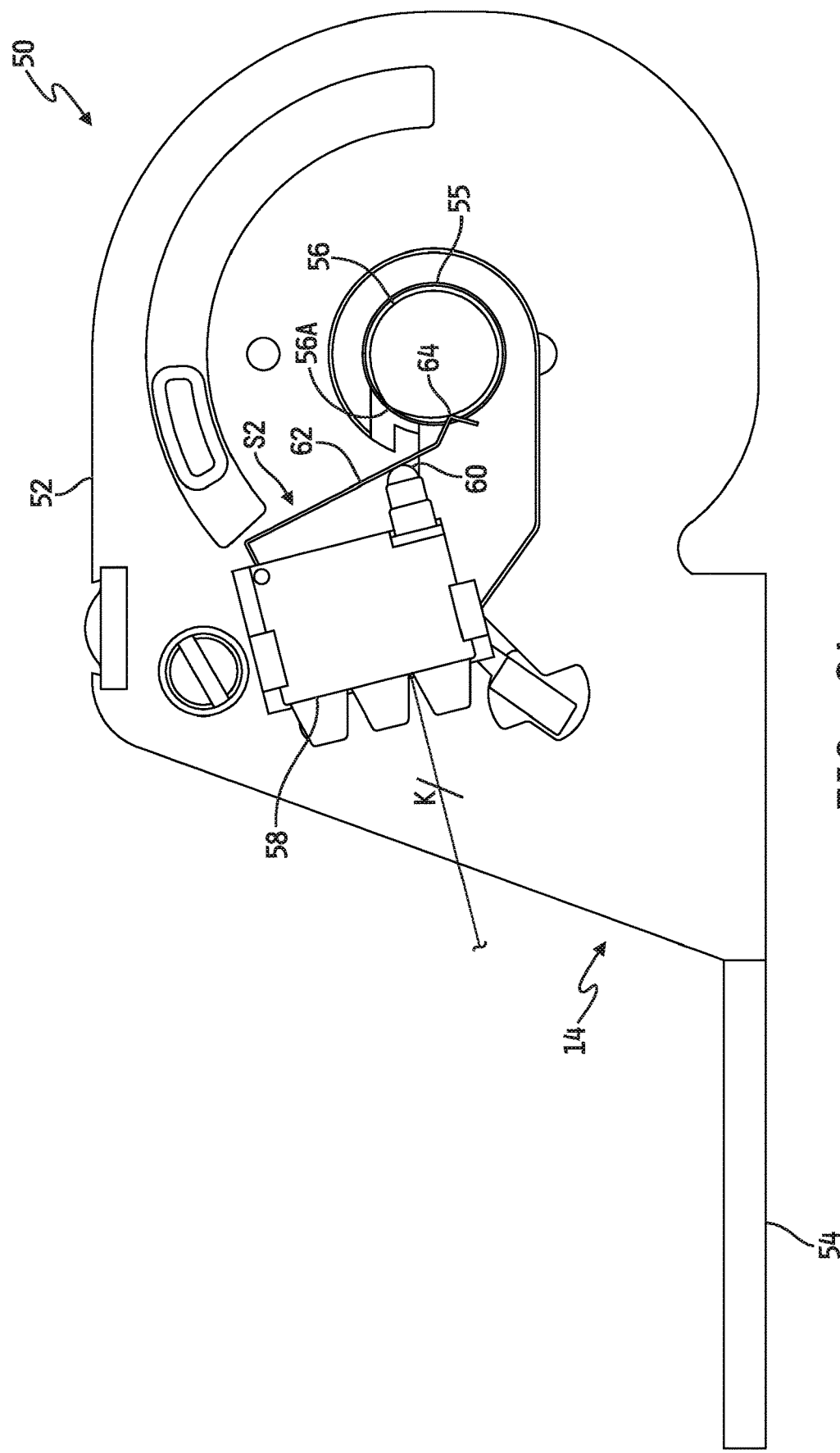

RESTRAINT SYSTEM FOR AN OCCUPANT SEAT MOUNTED IN A MOTOR VEHICLE

CROSS-REFERENCE TO RELATED APPLICATION

This patent application claims the benefit of, and priority to, U.S. Provisional Patent Application Ser. No. 62/552,611, filed Aug. 31, 2017, the disclosure of which is incorporated herein by reference.

FIELD OF THE INVENTION

The present invention relates generally to restraint systems for motor vehicles, and more specifically to restraint systems in which occupant operation of the restraint system operation is monitored and automatically acted upon.

BACKGROUND

Occupant restraint systems for motor vehicles may include one or more electronic sensors and/or electronically controlled units or actuators and/or electronically controlled indicators. It is desirable to monitor occupant operation of some such restraint systems and to control one or more electronically controlled units or actuators and/or one or more notification devices based thereon.

SUMMARY

The present disclosure may comprise one or more of the features recited in the attached claims, and/or one or more of the following features and combinations thereof. In one aspect, a restraint system for an occupant seat mounted in a motor vehicle may comprise a restraint harness having at least one web, a web retractor configured to be mounted to the occupant seat or a support surface to which the occupant seat is mounted within the motor vehicle, the web retractor having a rotatable shaft about which the at least one web is wound when retracting into the web retractor and from which the at least one web is unwound when being paid out of the web retractor, one of a tongue or buckle coupled to the at least one web, the other of the tongue or buckle configured to be mounted to one of the occupant seat or a support surface to which the occupant seat is mounted within the motor vehicle, the tongue and the buckle configured to releasably engage one another to restrain an occupant in the occupant seat with the restraint harness, a first sensor configured to produce a first signal corresponding to detection of an occupant being seated in the occupant seat, at least one second sensor operatively coupled to the web retractor and configured to produce at least one second signal corresponding to rotation of the rotatable shaft, a third sensor configured to produce a third signal corresponding to detection of engagement of the tongue with the buckle, and a processor including a memory having instructions stored therein which, when executed by the processor, cause the processor to produce at least one control signal configured to control at least one of an electronically controllable unit to disable or impede operation of the motor vehicle and a notification device to produce a notification unless, in sequence, the first sensor produces the first signal followed by the at least one second signal produced by the at least one second sensor indicating that the rotatable shaft of the web retractor has rotated by at least a threshold amount followed by the third sensor producing the third signal.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

FIG. 2A is a simplified diagram of an embodiment of the retractor assembly depicted in FIG. 1 including an embodiment of a web movement sensor.

DETAILED DESCRIPTION OF THE DRAWINGS

Figure 1:
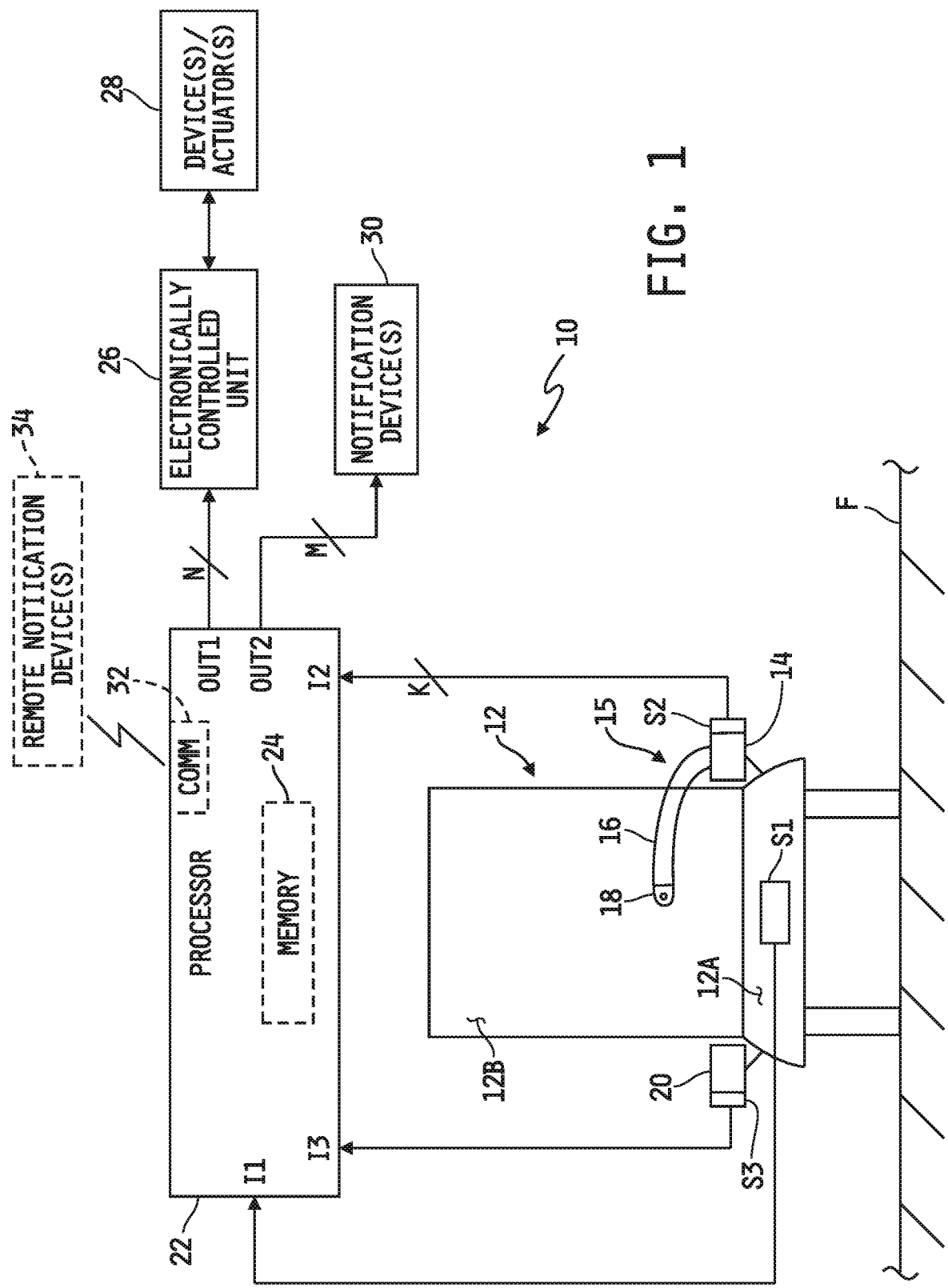
FIG. 1 is simplified diagram of an embodiment of a restraint system for an occupant seat mounted in a motor vehicle.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

It will be understood that, for purposes of this disclosure, all phrases recited in the attached claims in the general form "at least one of A and B" are intended to be interpreted as only A, only B or a combination of A and B.

Referring now to FIG. 1, an embodiment is shown of restraint system 10 for an occupant seat 12 mounted in a motor vehicle. In the illustrated embodiment, the occupant seat 12, has a seat bottom 12A configured to support an occupant of the seat 12 and a seat back 12B extending upwardly from the seat bottom 12A. In the illustrated embodiment, the occupant seat 12 is mounted to a floor F of the motor vehicle, although in alternate embodiments the occupant seat 12 may be mounted to one or more other structures of the motor vehicle or to a combination of the floor F and one or more other structures of the motor vehicle, in any conventional manner. The restraint system 10 illustratively includes a restraint harness 15 for restraining an occupant seated on the occupant seat 12. In the illustrated embodiment, the restraint harness 15 includes a single web 16 extendable from a retractor 14 of the restraint system 10. A buckle (or tongue) 20 configured to releasably engage a complementarily configured tongue (or buckle) 18 attached to the free end of the web 16. The restraint system 10 further includes a number of sensors S1, S2, S3 and a processor 22 including a memory 24. In some embodiments, the one or more electronically controlled units 26 may be carried by or mounted to or within the motor vehicle and electrically connected to the processor 22, and in some such embodiments one or more such units 26 may be coupled to one or more devices, systems or actuators 28. In some embodiments, one or more notification devices 30 may be carried by or mounted to or within the motor vehicle and electrically connected to the processor 22. In some embodiments, the restraint system 10 may include one or more remote notification devices 34, and in such embodiments the processor 22 may include, or be electrically connected to, a communication circuit 32 configured to communicate wirelessly with the one or more remote notification devices 34.

In the embodiment illustrated in FIG. 1, the restraint harness 15 is depicted as including only a single web 16, e.g., in the form of a conventional 2-point lap web restraint in which the retractor 14 and the tongue/buckle 18/20 serve as the two restraint points, although it will be understood that the restraint system 10 may alternatively be implemented in applications in which the restraint harness 15 has additional points of restraint. Examples of such alternate restraint harnesses 15 include, but are not limited to, a conventional 3-point restraint harness including a unitary or two-web shoulder and lap restraint, a conventional 4-point restraint harness including two unitary or two-web shoulder and lap restraints, a conventional 5-point restraint harness including two unitary or two-web shoulder and lap restraints and a crotch restraint and a conventional 6-point restraint harness including two unitary or two-web shoulder and lap restraints and two thigh-restraints. In any such alternate restraint system(s), it will be understood that one or more sensors S2 may be implemented in one or more retractors in embodiments which include multiple retractors and/or that one or more sensors S3 may be implemented in one or more buckles (and/or tongues) in embodiments which include multiple buckles and/or tongues.

In the embodiment illustrated in FIG. 1, the retractor 14 is depicted as being mounted to one side of the vehicle seat 12. In alternate embodiments, the retractor 14 may be mounted to the floor F or other structure within the motor vehicle (e.g., to a post, pillar, frame or other support structure of or within the motor vehicle). In the illustrated embodiment, the buckle 20 is illustratively secured, e.g., via a conventional anchor, to the opposite side of the seat 12, although in other embodiments the buckle 20 may instead be secured to the floor F or other support structure within the motor vehicle. In still other embodiments, the positions of the retractor 14 and the buckle 20 relative to the seat 12 may be swapped.

As is conventional, the retractor 14 illustratively has a rotatable shaft about which the web 16 is wound when retracting into the retractor and from which the web 16 is unwound when being paid out of the retractor 14. In some embodiments, the retractor may illustratively include a conventional spool that is rotatable with the shaft and to which one end of the web 16 is attached, although in other embodiments the one end of the web may be attached directly to the rotatable shaft. In any case, the retractor 14 further illustratively includes a conventional biasing member, e.g., spring, which biases the rotatable shaft (and/or spool) in a web take-up direction, i.e., so that the web 16 retracts within the retractor 14, and the biasing force such a biasing member is illustratively selected so as to be overcome by manually pulling the web 16 away from the retractor 14 such that the rotatable shaft rotates in a web payout direction as the web 16 is paid out of the retractor 14.

The sensor S1 is illustratively located on, in or adjacent to the seat bottom 12A and/or seat back 12B of the occupant seat 12, and is configured to produce a signal corresponding to detection of an occupant being seated in the seat 12. In one embodiment, the sensor S1 is illustratively provided in the form of a conventional pressure sensor mounted on or within the seat bottom 12A and configured to produce a pressure signal corresponding to an amount of downward pressure acting on the seat bottom 12A. In such embodiments, the memory 24 illustratively has a pressure threshold value stored therein, and further has instructions stored therein which, when executed by the processor 22, cause the processor 22 to monitor the pressure signal and determine that an occupant has been seated in the seat 12 if a downward pressure greater than a threshold pressure is acting on the seat bottom 12A as indicated by the pressure signal corresponding to a pressure value that is greater than the pressure threshold value stored in the memory 24. In alternate embodiments, the sensor S1 may illustratively be provided in the form of a conventional pressure switch that is calibrated produce an activation signal if the downward pressure acting on the seat bottom 12A exceeds a threshold pressure. In such embodiments, the instructions stored in the memory 24 include instructions which, when executed by the processor 22, cause the processor 22 to monitor the pressure switch S1 and determine that a downward pressure greater than the threshold pressure is acting on the seat bottom 12A if the pressure switch S1 produces the activation signal. In still other embodiments, the sensor S1 may be provided in the form of one or more proximity sensors and/or switches or other conventional sensor(s) configured to produce a signal upon detection of the occupant being seated in the occupant seat 12 or configured to produce a signal from which the processor 22 may determine if/when the occupant 12 has been seated in the occupant seat 12.

The sensor S2 is illustratively provided in the form of at least one sensor or switch operatively coupled to or mounted within the retractor 14 and configured to, in a broad sense, monitor movement of the web 16 relative to the web retractor 14, i.e., as the web 16 is paid out of and/or retracted within the retractor 14, and to produce a signal corresponding to such movement of the web 16 relative to the retractor 14. Example embodiments of the at least one sensor S2 mounted within the retractor 14 are illustrated in FIGS. 2A-11 and will be described in detail below. In any such embodiments, the instructions stored in the memory 24 illustratively include instructions which, when executed by the processor 22, cause the processor 22 to monitor S2 and determine from the signal(s) produced thereby whether a threshold length of the web 16 is paid out of the web retractor 14.

The sensor S3 is illustratively provided in the form of a conventional latch sensor or switch mounted to or within the buckle 20. In alternate embodiments, the sensor S3 may be provided in the form of a proximity sensor or other sensor configured to discriminate between latched and unlatched states of the tongue 18 and buckle 20. In any case, S3 is illustratively operable to produce a latch signal when the tongue 18 and the buckle 20 engage each other, i.e., are releasably engaged with each other. The instructions stored in the memory 24 illustratively include instructions which, when executed by the processor 22, cause the processor 22 to monitor the S3 and determine that the tongue 18 and buckle 20 are engaged with one another if/when the S3 produces the latch signal.

The sensor/switch signals S1, S2 and S3 are illustratively provided as inputs I1, I2 and I3 respectively to the processor 22, and the memory 24 is illustratively programmed with instructions which, when executed by the processor 22, cause the processor 22 to produce either or both of the control signal(s) OUT1 and/or OUT2 as a function of I1, I2 and I3. As illustrated in FIG. 1, the motor vehicle may include any number, N, of electronically controlled units 26 electrically connected to the output OUT1 of the processor 22 or otherwise communicatively coupled to the processor 22 (e.g., via wireless communication circuits), where N may be any positive integer. As further illustrated in FIG. 1, one or more such units 26 may be coupled, e.g., mechanically, hydraulically, pneumatically and/or electrically, to one or more devices, systems and/or actuators 28. Non-limiting examples of some such units 26 and systems, devices and/or actuators 28 will be described below. As further illustrated in FIG. 1, the restraint system 10 may include any number, M, of notification devices 30 electrically connected to the output OUT2 of the processor 22, and non-limiting examples of some such notification devices will be described below, wherein M may be any positive integer. Alternatively or additionally, at least one remote notification device 34 may be provided and configured for wireless communications with the processor 22. In such embodiments, the processor 22 illustratively includes or is electrically connected to a wireless communication circuit 32 configured to communicate wirelessly with the at least one remote notification device 34. Non-limiting examples of the at least one remote notification device 34 will be described below.

In embodiments that include one or more electronically controlled units 26, such one or more electronically controlled units 26 may be or include any one or more conventional, electronically controllable units, systems, actuators or the like which may be controlled by the processor 22 and which, when controlled, affects operation of the motor vehicle itself, e.g., the ability of the motor vehicle to move, or operation of a driven or actuated component of the motor vehicle. Examples of the one or more electronically controlled units 26 may include, but are not limited to, a conventional fuel system operatively coupled to a conventional engine of the motor vehicle, a conventional ignition system operatively coupled to a conventional engine of the motor vehicle, a conventional electronically controlled transmission coupled to a conventional engine of the motor vehicle, a conventional electronically controlled hydraulic actuator operatively coupled to the motor vehicle and to one or more hydraulically actuated components carried by or separate from the motor vehicle, a conventional electronically controlled pneumatic actuator operatively coupled to the motor vehicle and to one or more pneumatically actuated components carried by or separate from the motor vehicle and a conventional power takeoff (PTO) unit operatively coupled to or otherwise driven by a conventional engine or transmission of the motor vehicle and to one or more PTO-driven components carried by or separate from the motor vehicle. Examples of the one or more systems, devices and/or actuators 28 may include, but are not limited to, a conventional accelerator pedal or similar fueling control mechanism manually movable in a conventional manner between idle and full-throttle positions, a conventional keyed on non-keyed ignition starting switch, a conventional manually-actuated transmission shifting control lever, one or more conventional hydraulically-actuated components such as lift arms, one or more buckets, a backhoe, pallet forks, an angle broom, a sweeper, an auger, a mower, a snow blower, a stump grinder, a tree spade, a trencher, a dumping a hopper, a tiller, a ripper, a grapple, a tilt, a roller, a snow blade, a wheel saw, a cement mixer, a wood chipper, a hydraulic breaker, or the like, one or more conventional pneumatically-actuated components such as any of the preceding example components, and one or more conventional PTO-driven components such as any of the preceding example components, a water pump on a fire truck or water truck, floor cleaning machinery, a blower system, a vehicle bed raising mechanism, a winch, a trash compactor, a boom and/or a grapple, or the like.

In embodiments that include one or more notification devices 30, such one or more notification devices may be or include any conventional visible, audible and/or tactile device mounted to or within the motor vehicle. In embodiments that include one or more remote notification devices 34, such one or more remote notification devices 34 may be or include any conventional visible, audible and/or tactile device located remotely from the motor vehicle. It is to be understood that, in some embodiments, one or more remote notification devices 34 may be alternatively implemented in the form of a mobile or desktop electronic device such as a computer, mobile phone, tablet computer, or the like, and in such embodiments the processor 22 may be operable to control the communication circuit 32 to wirelessly transmit one or more messages to the one or more remote notification devices 34, e.g., via conventional short-range wireless communication hardware and communication protocol such as Bluetooth® or other short-range technology, or via conventional long-range wireless communication hardware and communication protocol such as the Internet. As an example of the latter, the processor 22 may be configured, i.e., programmed, to wirelessly transmit a message, report or other indicator relating to the sequential states or statuses of the sensors S1, S2, S3, as described below, to a remote notification device 34, e.g., via email, text messaging, or the like for viewing by a supervisor or employer of an operator/occupant of the motor vehicle, by a monitoring service hired by an employer of the operator/occupant of the motor vehicle and/or by one or more other persons. As another example, the processor 22 may be configured, i.e., programmed, to wirelessly transmit a message, report or other indicator relating to the sequential states or statuses of the sensors S1, S2, S3 as described below to a secure website or web-based service accessible by one or more remote notification devices 34 for viewing by a supervisor or employer of an operator/occupant of the motor vehicle, by a monitoring service hired by an employer of the operator/occupant of the motor vehicle or by one or more other persons.

In one embodiment, the OUT1 and/or OUT2 signal is illustratively normally inactive, and will remain so only if signals are sequentially produced, in order, by S1, S2 and S3 to indicate that (1) the occupant/operator is first seated in the occupant seat 12, (2) a threshold length of the web 16 is thereafter drawn from the retractor 14, and (3) the tongue 18 is then latched to the buckle 20. In one embodiment in which S1 is provided in the form of a pressure sensor or switch and S3 is provided in the form of a latch sensor or switch, S1, S2 and S3 are monitored by the processor 22 pursuant to instructions stored in the memory 24 which, when executed by the processor 22, cause the processor 22 to produce the OUT1 and/or OUT2 control signal(s) to control the electronically controlled unit 26 and/or activate the one or more notification devices 30, and/or to control the communication circuit 32 to wirelessly activate or transmit a message to the one or more remote notification devices 34 unless, in order, the signal produced by S1 indicates that a downward pressure greater than a threshold pressure is acting on the seat bottom 12A from the top surface thereof, followed by the signal produced by S2 indicating that a threshold length of the web 16 is paid out of the web retractor 14 followed by the signal produced by S3 indicating that the tongue 18 and buckle 20 are engaged with one another. If such signals are produced by S1, S2 and S3 in any other order, and/or if one or more of the sensors S1, S2, S3 fails to produce the corresponding signal in a timely manner, the processor 22 produces the OUT1 and/or OUT2 control signal(s) to control the electronically controlled unit 26 and/or activate the one or more notification devices 30, and/or to control the communication circuit 32 to wirelessly activate or transmit a message to the one or more remote notification devices 34.

In some embodiments, the motor vehicle and/or the restraint system 10 includes only the notification device 30 or the one or more remote notification devices 34, and in such embodiments production by the processor 22 of the OUT2 signal activates the notification device 30 to notify the occupant that the above-described events do not occur in the required sequence and/or control of the communication circuit 32 by the processor 22 operates to notify another person or device of the same. In some embodiments, the occurrence of production of the OUT2 signal and/or of the message sent by the communication circuit 32 is stored, and optionally date stamped, in the memory 24. In other embodiments, the processor 22 illustratively produces only the OUT1 control signal to cause the motor vehicle to be partially or wholly inoperable. In other still embodiments, the processor 22 may produce any combination of the OUT1 control signal, the OUT2 control signal and the one or more wireless communication signals.

In embodiments in which the processor 22 is operable to produce the OUT1 control signal if/when the signals from the sensors S1, S2, S3 are not each timely received in order as described above, the processor 22 is illustratively configured, i.e., programmed, to control the signal produced at OUT1 in a manner which disables or impedes operation of the motor vehicle. It will be understood that the phrase "disables or impedes operation of the motor vehicle," as used in this disclosure, is intended to encompass operation of the motor vehicle itself, e.g., movement of the motor vehicle in any direction, as well as operation of any component of the motor vehicle, e.g., including an engine of the motor vehicle and/or any component actuated, driven or otherwise controlled by the engine and/or any component actuated, driven or otherwise controlled by an actuating device or system onboard the motor vehicle. In this regard, control by the processor 22 of the signal produced at OUT1 will generally be dependent upon the structural implementation of the electronically controlled unit 26 and, in embodiments that include it/them, the structural implementation of the system(s), device(s) or actuator(s) 28 coupled thereto.

As one non-limiting example, the electronically controlled unit 26 may be a motor vehicle fuel system operatively coupled to the engine of the motor vehicle and the device(s)/actuator(s) 28 may be an accelerator pedal movable between idle and full throttle positions. In this example, the OUT1 control signal produced by the processor 22 if/when the signals from the sensors S1, S2, S3 are not each timely received in order illustratively controls the fuel system 26 to limit fueling to the engine in a manner that limits the rotational speed of the engine to an idle speed regardless of the position or movement of the accelerator pedal so as to prevent the occupant/operator from moving the vehicle at speeds greater than that attainable at the engine idle speed.

As another non-limiting example, the electronically controlled unit 26 may be a motor vehicle ignition system operatively coupled to the engine of the motor vehicle and the device(s)/actuator(s) 28 may be a keyed or non-keyed ignition switch. In this example, the OUT1 control signal produced by the processor 22 if/when the signals from the sensors S1, S2, S3 are not each timely received in order illustratively disables the ignition system 26 so that the engine will not start regardless of the position or activation of the ignition switch so as to prevent the occupant/operator from starting the engine. In one variant of this example in which the engine is running when the signals from the sensors S1, S2, S3 are processed, the OUT1 control signal produced by the processor 22 if/when the signals from the sensors S1, S2, S3 are not each timely received in order illustratively controls the ignition system 26 to shut down, i.e., turn off, the engine.

As a further non-limiting example, the electronically controlled unit 26 may be an electronically controllable transmission operatively coupled to the engine of the motor vehicle. In this example, the OUT1 control signal produced by the processor 22 if/when the signals from the sensors S1, S2, S3 are not each timely received in order illustratively disables electronically-controlled shifting, i.e., automatic shifting, of the transmission 26 so that the torque supplied to the wheels of the motor vehicle and/or the ground speed of the vehicle will be thereby limited. In one variant of this example, the OUT1 control signal produced by the processor 22 if/when the signals from the sensors S1, S2, S3 are not each timely received in order illustratively controls the transmission 26 to disable engagement of a drive gear of the transmission 26 so that the motor vehicle will not be movable.

As yet another non-limiting example, the electronically controlled unit 26 may be an electronically controlled hydraulic (or pneumatic) actuator on-board the motor vehicle and the device(s)/actuator(s) 28 may be or include one or more hydraulically (or pneumatically) controlled attachments operatively coupled to the hydraulic actuator 26, wherein the one or more hydraulically (or pneumatically) controlled attachments may be or include any conventional attachments including, but not limited to, any of the examples described hereinabove. In this example, the OUT1 control signal produced by the processor 22 if/when the signals from the sensors S1, S2, S3 are not each timely received in order illustratively disables operation of the electronically controlled hydraulic actuator 26, thereby rendering inoperable any hydraulically-controlled attachment 28 operatively coupled thereto, or disables operation of at least one of the one or more hydraulically-controlled attachments 28 operatively coupled to the actuator 26.

As yet a further non-limiting example, the electronically controlled unit 26 may be an electronically controlled power takeoff (PTO) unit on-board the motor vehicle and coupled, either directly or indirectly, to the engine of the motor vehicle, and the device(s)/actuator(s) 28 may be or include one or more PTO-driven attachments operatively coupled or couplable to the PTO unit 26, wherein the one or more attachments may be or include any conventional PTO-driven or drivable attachments including, but not limited to, any of the examples described hereinabove. In this example, the OUT1 control signal produced by the processor 22 if/when the signals from the sensors S1, S2, S3 are not each timely received in order illustratively disables operation of the electronically controlled PTO unit 26, thereby rendering inoperable any PTO-driven or drivable attachment 28 operatively coupled or couplable thereto, or disables operation of at least one of the one or more attachments 28 operatively coupled or couplable to the PTO unit 26.

Those skilled in the art will recognize the OUT1 control signal produced by the processor 22 if/when the signals from the sensors S1, S2, S3 are not each timely received in order may illustratively control other electronically controlled units 26 onboard the motor vehicle in a manner which disables or otherwise controls operation thereof and/or operation of one or more device(s), system(s) or actuator(s) 28 that may be operatively coupled thereto, and it will be understood that such other electronically controlled units 26 and/or one or more such other device(s), system(s) or actuator(s) 28 are contemplated by this disclosure.

Figure 2B:
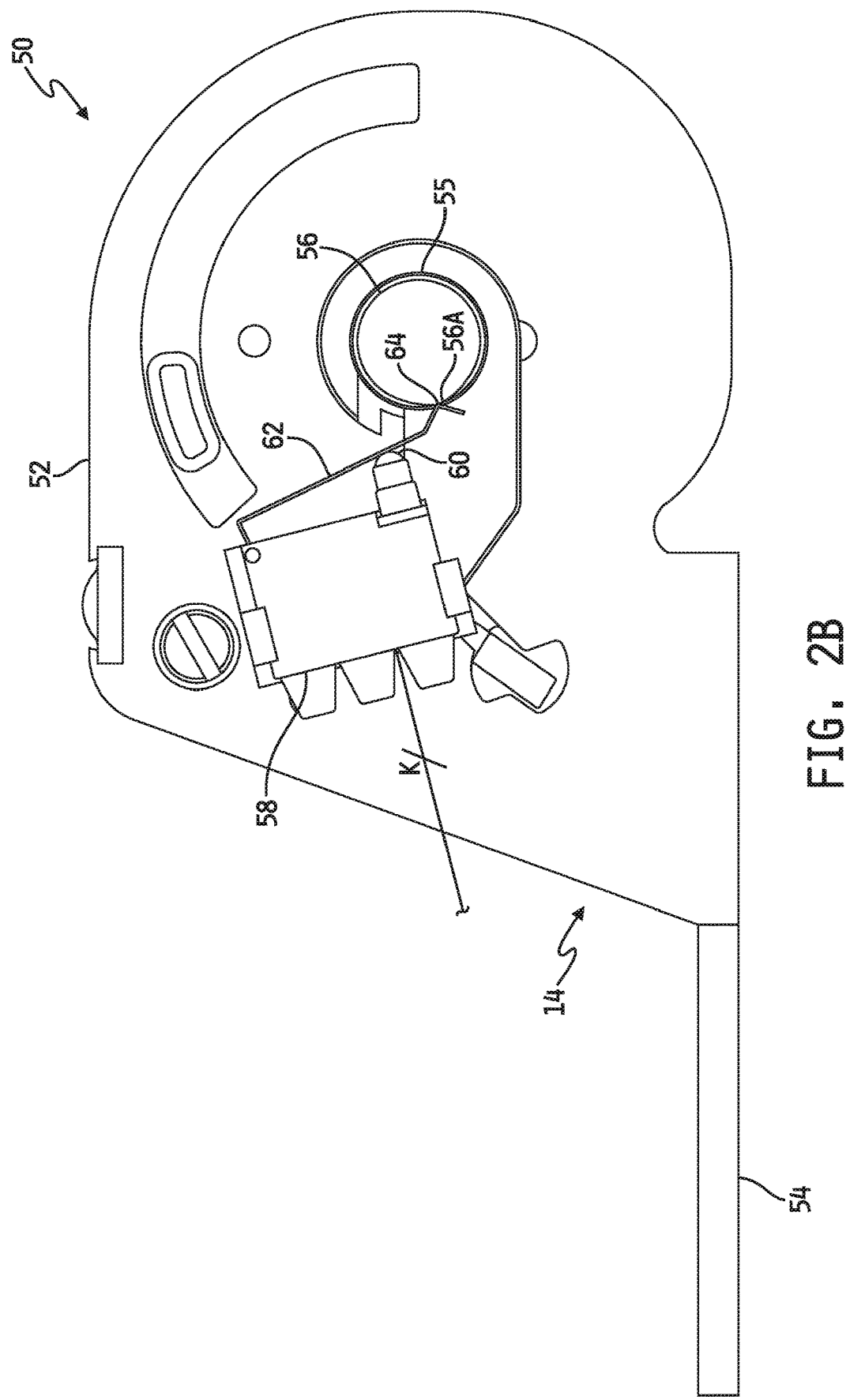
FIG. 2B is a simplified diagram similar to FIG. 2A showing the sensor follower riding on a lobe of the retractor shaft.
Figure 3:
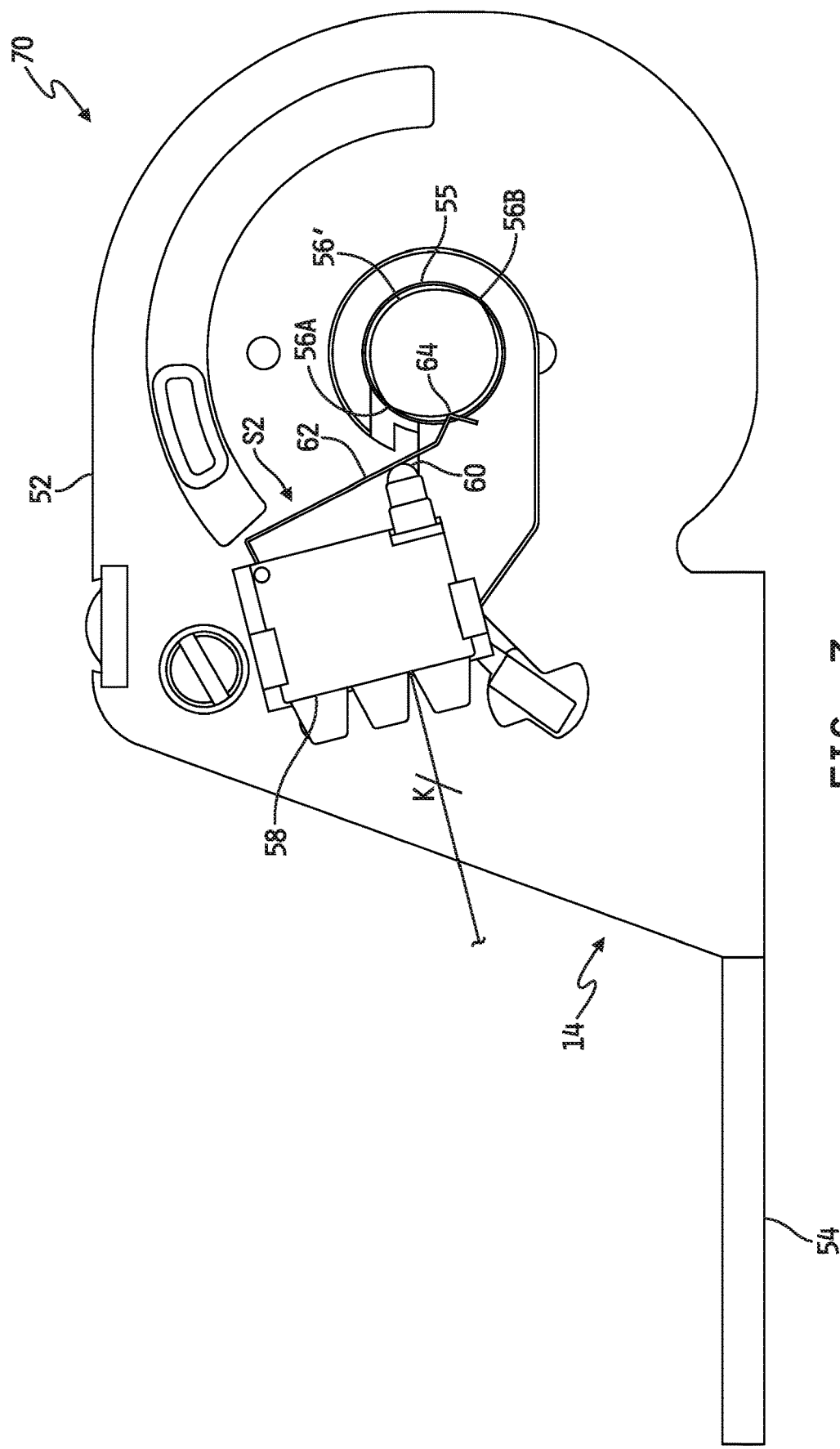
FIG. 3 is a simplified diagram of another embodiment of the retractor assembly depicted in FIG. 1 including another embodiment of a web movement sensor.

Referring now to FIGS. 2A and 2B, an embodiment is shown of a retractor assembly 50 in which the sensor S2 implemented in the retractor 14 in the form of a single shaft rotation detection switch. In the illustrated embodiment, the retractor 14 includes a frame 52 mounted to an anchor plate 54 via which the retractor assembly 50 may be mounted to the occupant seat 12 or floor F of the motor vehicle in a conventional manner. The retractor 14 further includes a rotatable shaft 56 rotatably mounted to the frame 52. In the illustrated embodiment, the retractor 14 further includes a spool 55 carried by the shaft 56 such that the spool 55 rotates with the shaft 56 relative to the frame 52. Illustratively, the spool 55 is configured to attach one end of the web 16 thereto such that the web 16 wraps around the spool 55 (and therefore also about the shaft 56) as the shaft 56 and spool 55 together rotate in a web take-up direction to retract the web 16 into the retractor 14, and such that the web 16 unwraps from the spool 55 (and therefore also from the shaft 56) as the shaft 56 and spool 55 together rotate in a web pay-out direction to pay out the web 16 from the retractor 14, as is conventional. In alternate embodiments, the spool 55 may be omitted, and the web 16 may be coupled directly to the shaft 56 such that the web 16 wraps and unwraps directly on and from the shaft 56. In some embodiments, the retractor 14 further illustratively includes a conventional biasing member, e.g., spring, (not shown) which biases the rotatable shaft 56 (and/or spool 55) in the web take-up direction, i.e., so that the web 16 normally retracts within the retractor 14, and the biasing force of such a biasing member is illustratively selected so as to be overcome by manually pulling the web 16 away from the retractor 14 such that the rotatable shaft 56 rotates in the web payout direction to pay out the web 16 from the retractor 14.

In the illustrated embodiment, S2 is provided in the form of a single shaft rotation detection switch including a switch housing 58 mounted to the frame 52 of the retractor 14 or to another stationary component of the retractor 14 and an actuatable switch 60 carried by the switch housing 58. The shaft 56 illustratively includes a cam lobe 56A protruding radially away from the shaft 56 at least in the area of the shaft 56 that is adjacent to the switch housing 58. One end of a resilient follower 62 is coupled to the switch housing 58 and an opposite end carries a protrusion 64 which contacts the shaft 56. Between the two ends, the follower 62 illustratively contacts the switch 60. The follower 62 is illustratively biased so that the protrusion 64 is normally forced away from the switch 60 and against the rotatable shaft 56. The follower 62 is thus operatively coupled between and engages each of the retractor switch housing 58 and the rotatable shaft 56 such that the protrusion 64 of the follower 62 rides on the shaft 56 as it rotates. As long as the protrusion 64 of the follower 62 is not riding on or engaging the lobe 56A, the switch 60 is not actuated by the follower 62 as illustrated in FIG. 2A. As illustrated in FIG. 2B, the shaft 56 has rotated from the position illustrated in FIG. 2A such that the protrusion 64 of the follower 62 contacts the cam lobe 56A. The cam lobe 56A forces the follower 62 sufficiently toward the switch 60 to actuate the switch 60 and cause the switch 60 to change states when the protrusion 64 of the follower 62 rides on or engages the cam lobe 56A.

The switch 60 may illustratively be configured to be normally activated when the follower 62 is not engaging the cam lobe 56A as illustrated in FIG. 2A and to be unactivated when the follower is engaging the cam lobe 56A as illustrated in FIG. 2B, or vice versa. In any case, the number of times that the switch 60 changes state as the web 16 is paid out of the retractor 14 will depend on how much of the web 16, i.e., its length, is paid out from the shaft 56 and spool 55. In one embodiment, the instructions stored in the memory 24 illustratively include instructions which, when executed by the processor 22, cause the processor 22 to monitor the retractor switch 60 and determine that the "threshold length of web," as described above in the sequence detection of S1, S2, S3, is paid out of the web retractor 14 if the shaft 56 or spool 55 rotates a predefined number of times as detected by the processor 22 if/when the signal produced by the switch 60 changes between the two states a corresponding threshold number of times. Illustratively, the threshold number of times will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal produced by the retractor switch 60, determining the number of times the signal produced by the switch 60 changes state, determining or estimating the amount, i.e., length, of the web 16 that is paid out of the retractor 14 as a function of the number of times the signal produced by the switch 60 changes state, and then comparing the determined or estimated length of the paid out portion of the web 16 to a threshold web length value.

It will be appreciated that whereas the rotatable shaft 56 illustrated in FIGS. 2A and 2B includes a single lobe 56A, the shaft 56 may alternatively include any number of lobes extending radially outwardly therefrom. In the retractor assembly embodiment 70 illustrated in FIG. 3, for example, the shaft 56' defines two lobes 56A, 56B each extending radially away from one another in opposite directions, with the remaining components of the retractor assembly 70 being identical to those of the retractor assembly 50 illustrated in FIGS. 2A and 2B. In other alternative embodiments, the shaft 56 may define three or more lobes spaced evenly or unevenly about the shaft 56. Generally, the resolution of shaft rotation or web length detection by the processor 22 will depend, at least in part, on the number of cam lobes defined on the retractor shaft 56 and no limit on the number of cam lobes that may be defined on the retractor shaft 56 is therefore intended by this disclosure.

Figure 4:
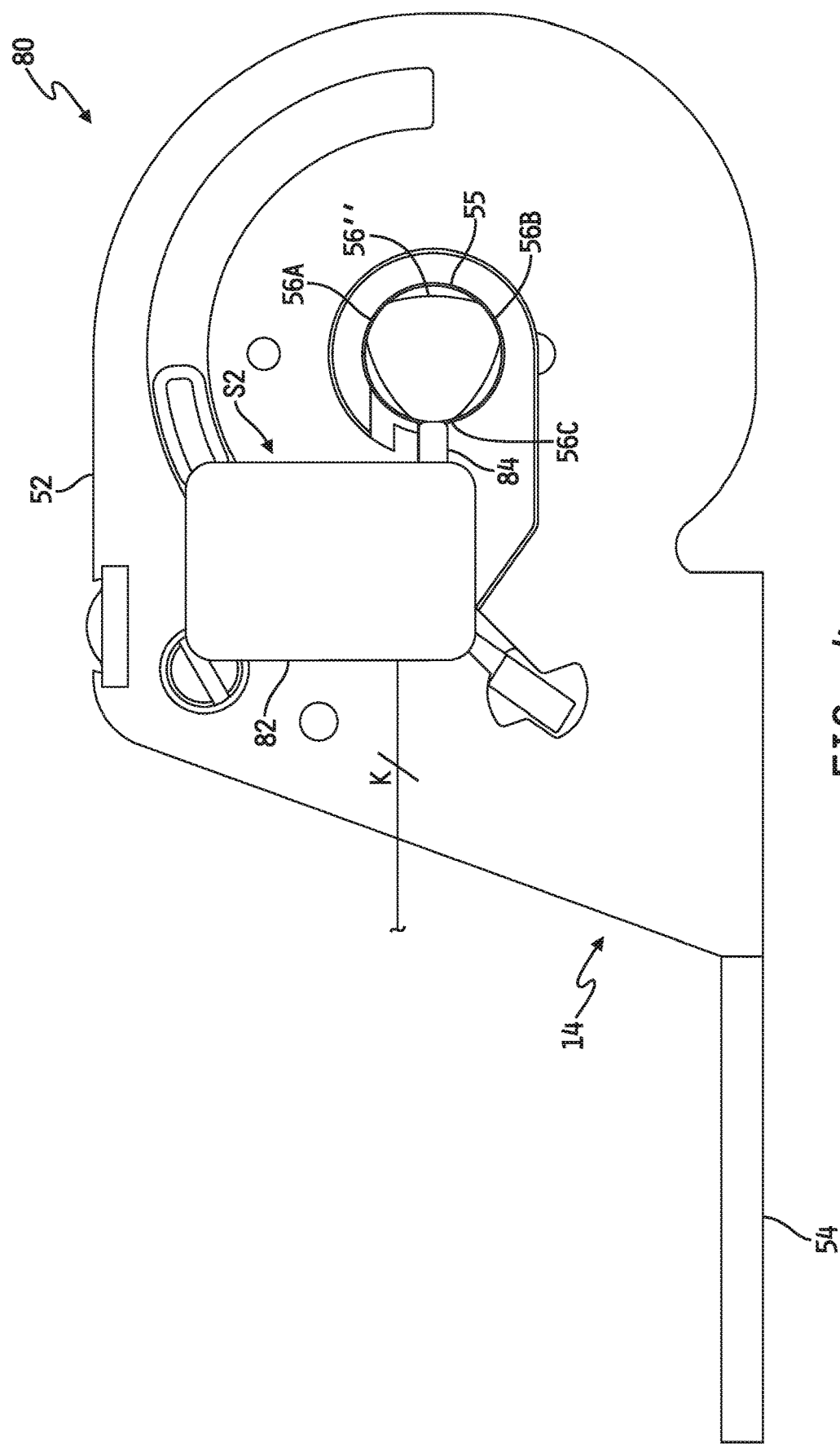
FIG. 4 is a simplified diagram of yet another embodiment of the retractor assembly depicted in FIG. 1 including yet another embodiment of a web movement sensor.

Referring now to FIG. 4, another embodiment is shown of a retractor assembly 80 in which the sensor S2 implemented in the retractor 14 in the form of a single shaft rotation detection sensor. In the illustrated embodiment, many of the components and features of the retractor 14 are as described with respect to FIGS. 2A and 2B, and like numbers are therefore used to identify like components. In the embodiment illustrated in FIG. 4, S2 illustratively includes a sensor body 82 mounted to the frame 52 of the retractor 14 or to another stationary component of the retractor 14 and proximity sensor 84 is carried by the sensor housing 82 and oriented toward the rotatable shaft 56" as shown. The shaft 56" is illustratively depicted as including three equally spaced apart cam lobes 56A, 56B, 56C each protruding radially away from the shaft 56 at least in the area of the shaft 56 that is adjacent to the proximity sensor 84, although it will be understood that more or fewer such cam lobes may be provided in alternate embodiments. In some embodiments, the proximity sensor may be a conventional capacitive sensor, although other conventional sensor technologies may be alternatively implemented. Examples of such other conventional sensor technologies may include, but are not limited to, inductive sensors (e.g., variable reluctance or other inductive sensors), magnetic sensors and the like. In any case, the proximity sensor 84 is configured to produce a lobe detection signal each time one of the lobes 56A, 56B, 56C passes within a detection distance of the proximity sensor 84. In this regard, the position of the sensor 84 relative to the shaft 56" is illustratively selected so as to be able to discriminate passage thereby of the lobes 56A, 56B, 56C from the portions of the shaft 56" between the lobes 56A, 56B, 56C. The instructions stored in the memory 24 illustratively include instructions which, when executed by the processor 22, cause the processor 22 to monitor the proximity sensor 84 to determine passage thereby any of the lobes 56A, 56B, 56C, and to determine that the "threshold length of web," as described above in the sequence detection of S1, S2, S3, is paid out of the web retractor 14 if a threshold number of lobe detections are produced by the sensor 84. Illustratively, the threshold number of lobe detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal produced by the sensor 84 to determine passage thereby any of the lobes 56A, 56B, 56C, determining or estimating the amount, i.e., length, of the web 16 that is paid out of the retractor 14 as a function of the number of lobe detections produced by the sensor 84, and then comparing the determined or estimated length of the paid out portion of the web 16 to a threshold web length value.

Figure 5:
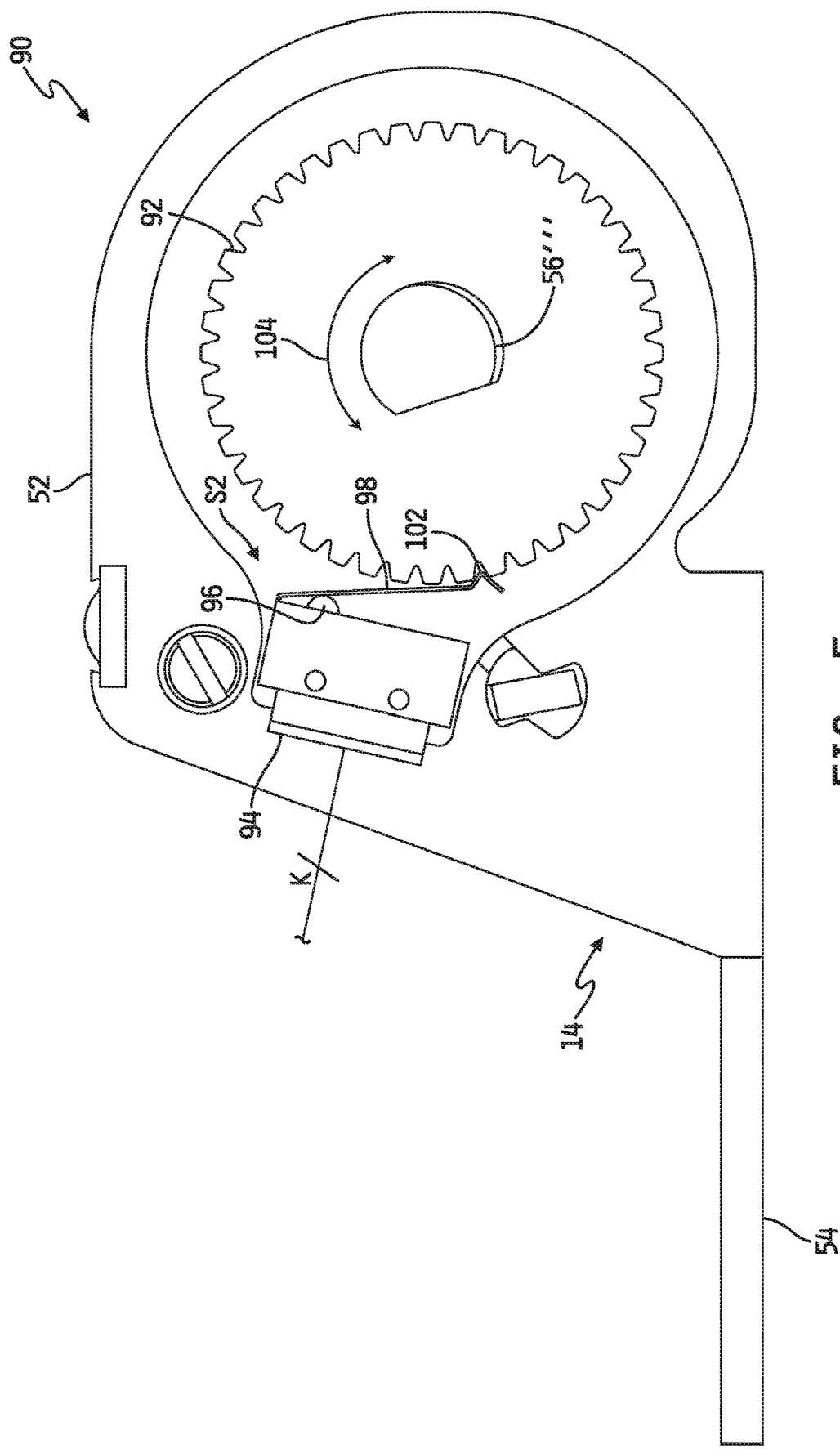
FIG. 5 is a simplified diagram of still another embodiment of the retractor assembly depicted in FIG. 1 including still another embodiment of a web movement sensor.

Referring now to FIG. 5, yet another embodiment is shown of a retractor assembly 90 in which the sensor S2 implemented in the retractor 14 in the form of a single shaft, gear or wheel rotation detection switch. In the illustrated embodiment, many of the components and features of the retractor 14 are as described with respect to FIGS. 2A and 2B, and like numbers are therefore used to identify like components. In the embodiment illustrated in FIG. 5, S2 illustratively includes a switch body 94 mounted to the frame 52 of the retractor 14 or to another stationary component of the retractor 14 and switch 96 is carried by the switch housing 94. A toothed gear or wheel 92 is mounted to the rotatable shaft 56'" such that the gear 92 rotates with the shaft 56'". The gear 92 illustratively defines a plurality of teeth at and about its outer periphery. The gear 92 may be configured with any number of such teeth, and therefore no limit on the number of teeth is intended or should be implied. In any case, one end of a resilient follower 98 is coupled to the switch housing 94 and an opposite end carries a protrusion 102 which is biased into contact with the outer periphery of the gear 92 as depicted in FIG. 5. Between the two ends, the follower 98 illustratively contacts the switch 96. The follower 98 is thus operatively coupled between and engages each of the retractor switch 96 and the gear 92 with the protrusion 102 biased against and riding on the outer periphery of the gear 92 as it rotates with the shaft 56'".

Illustratively, the protrusion 102 defined at the free end of the follower 98 is sized to be received between adjacent teeth defined along the outer periphery of the gear 92. In this regard, as long as the protrusion 102 of the follower 98 is received within a space between adjacent teeth defined along the outer periphery of the gear 92, the switch 96 is not actuated by the follower 96 as illustrated by example in FIG. 5. However, as the gear 92 rotates, as indicated by the bi-directional arrow 104, any tooth defined along the outer periphery of the gear 92 acting on the protrusion 102 will force the follower 98 sufficiently toward the switch 96 to actuate the switch 96 and cause it to change to states. The switch 96 may illustratively be configured to be normally activated when the follower 96 is received in a space between adjacent teeth defined along the outer periphery of the gear 92 and to be unactivated when the follower 96 is engaging one of the teeth defined along the periphery of the gear 92, or vice versa.

In any case, the switch 96 is configured to produce a tooth detection signal each time one of the teeth forces the follower 98 against, and thereby actuating, the switch 96. In this regard, the combination of the switch 96, follower 98 and protrusion 102 is illustratively able to discriminate between the various teeth of the gear or wheel 92 and the spaces between the teeth. The instructions stored in the memory 24 illustratively include instructions which, when executed by the processor 22, cause the processor 22 to monitor the switch 96 to determine detection thereby of individual ones of the teeth defined about the periphery of the gear or wheel 92 as just described, and to determine that the "threshold length of web," as described above in the sequence detection of S1, S2, S3, is paid out of the web retractor 14 if a threshold number of tooth detections are produced by the switch 96. Illustratively, the threshold number of tooth detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal produced by the switch 96 to determine detection thereby of individual ones of the teeth defined about the periphery of the gear or wheel 92 as just described, determining or estimating the amount, i.e., length, of the web 16 that is paid out of the retractor 14 as a function of the number of tooth detections produced by the switch 96, and then comparing the determined or estimated length of the paid out portion of the web 16 to a threshold web length value.

Figure 6:
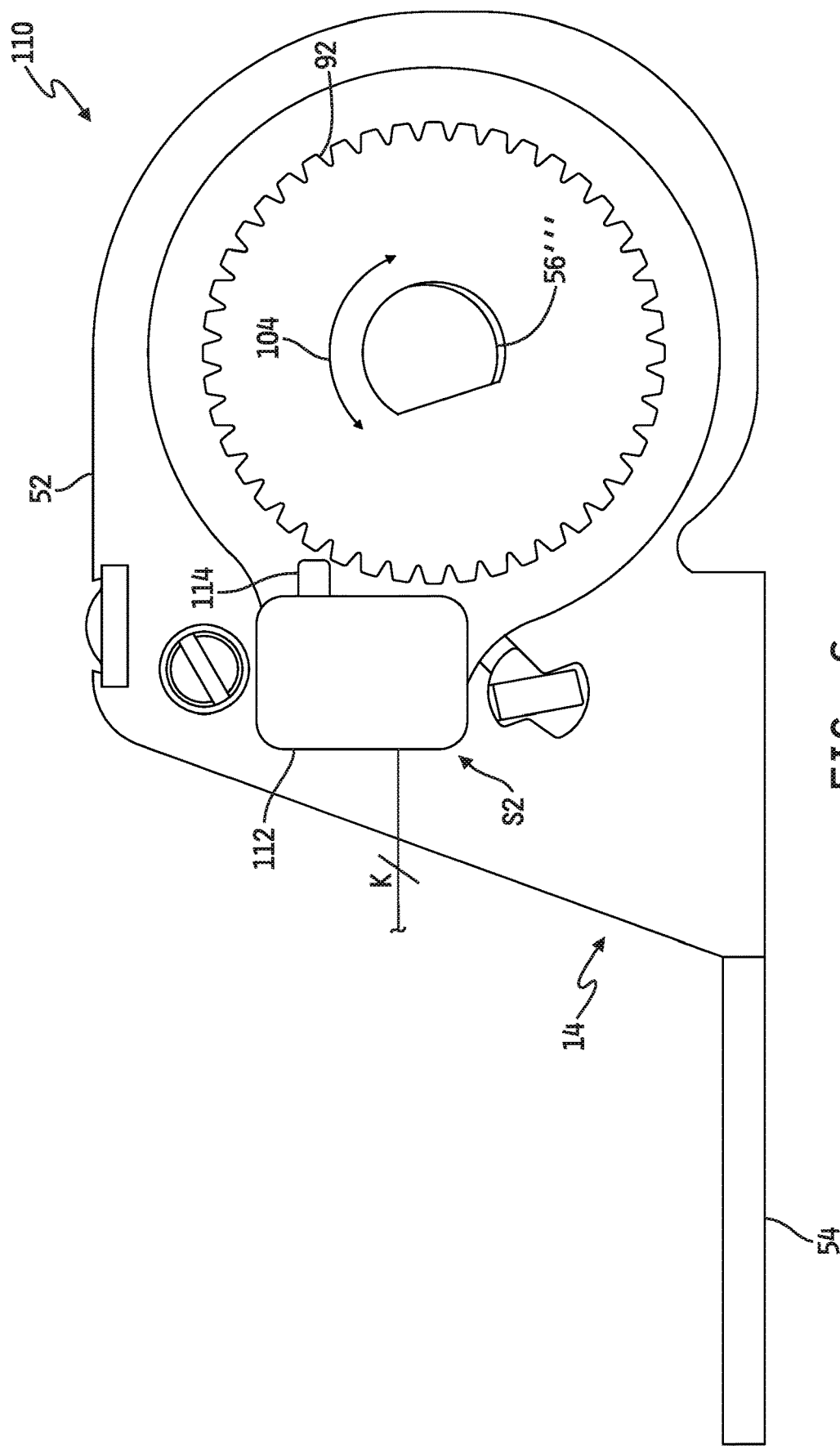
FIG. 6 is a simplified diagram of a further embodiment of the retractor assembly depicted in FIG. 1 including a further embodiment of a web movement sensor.

Referring now to FIG. 6, still another embodiment is shown of a retractor assembly 110 in which the sensor S2 implemented in the retractor 14 in the form of a single shaft, gear or wheel rotation detection switch. In the illustrated embodiment, many of the components and features of the retractor 14 are as described with respect to FIGS. 2A and 2B, and like numbers are therefore used to identify like components. In the embodiment illustrated in FIG. 6, S2 illustratively includes a sensor body 112 mounted to the frame 52 of the retractor 14 or to another stationary component of the retractor 14 and proximity sensor 114 carried by the sensor housing 112. The shaft 56''' illustratively has a toothed wheel or gear 92 mounted thereto as described with respect to FIG. 5. In some embodiments, the proximity sensor 114 may be a conventional inductive sensor, although other conventional sensor technologies may be alternatively implemented. Examples of such other conventional sensor technologies may include, but are not limited to, capacitive sensors, magnetic sensors and the like. In any case, the proximity sensor 114 is configured to produce a tooth detection signal each time one of the teeth defined along the outer periphery of the gear 92 passes within a detection distance of the proximity sensor 114. In this regard, the position of the sensor 114 relative to the shaft 56''' is illustratively selected so as to be able to discriminate passage thereby of the teeth from the spaces defined between the teeth. The instructions stored in the memory 24 illustratively include instructions which, when executed by the processor 22, cause the processor 22 to monitor the sensor 114 to determine detection thereby of individual ones of the teeth defined about the periphery of the gear or wheel 92 as just described, and to determine that the "threshold length of web," as described above in the sequence detection of S1, S2, S3, is paid out of the web retractor 14 if a threshold number of tooth detections are produced by the sensor 114. Illustratively, the threshold number of tooth detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal produced by the sensor 114 to determine detection thereby of individual ones of the teeth defined about the periphery of the gear or wheel 92 as just described, determining or estimating the amount, i.e., length, of the web 16 that is paid out of the retractor 14 as a function of the number of tooth detections produced by the sensor 114, and then comparing the determined or estimated length of the paid out portion of the web 16 to a threshold web length value.

Figure 7:
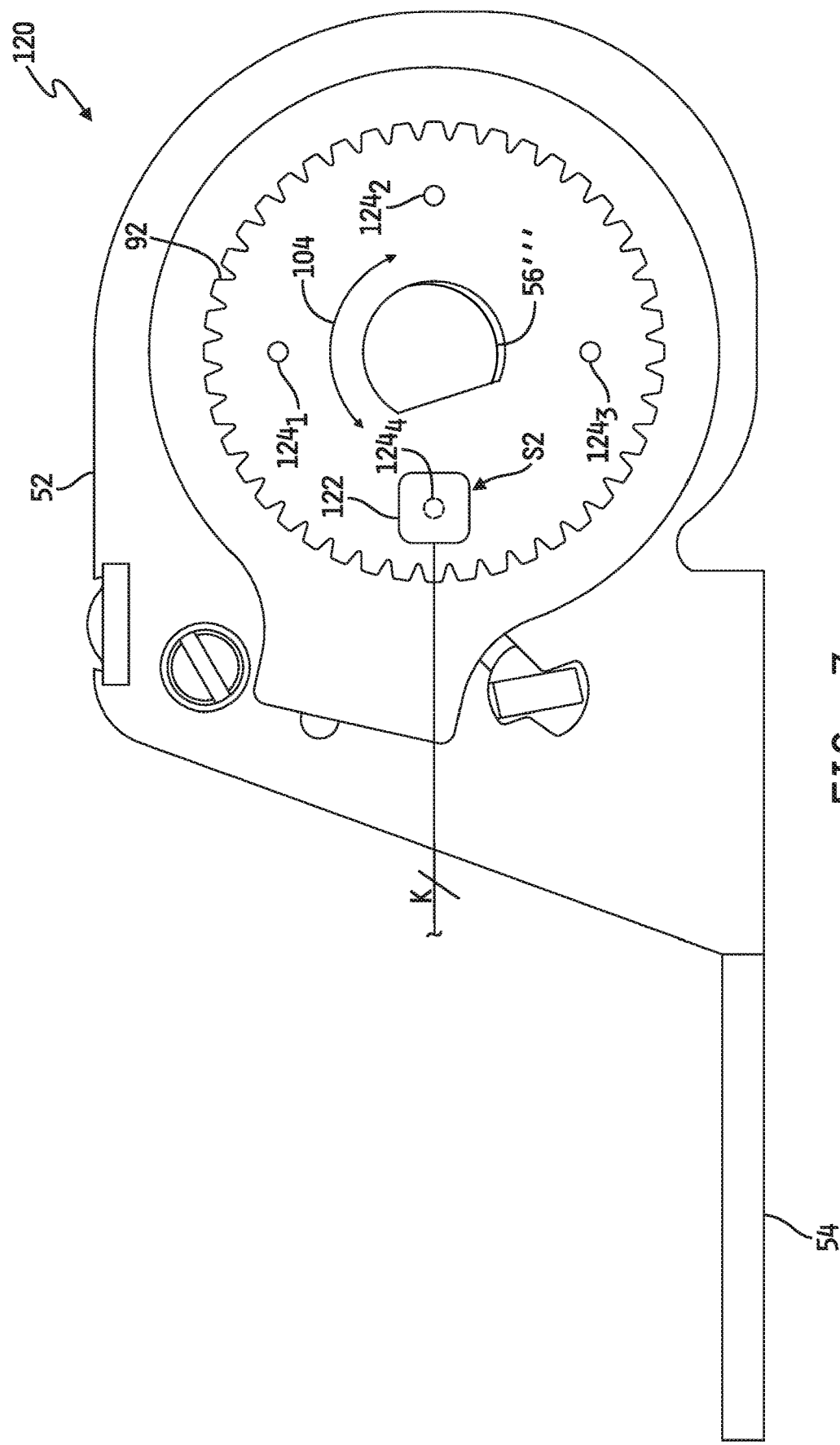
FIG. 7 is a simplified diagram of yet a further embodiment of the retractor assembly depicted in FIG. 1 including yet a further embodiment of a web movement sensor.

Referring now to FIG. 7, a further embodiment is shown of a retractor assembly 120 in which the sensor S2 implemented in the retractor 14 in the form of a single shaft, wheel or gear rotation sensor. In the illustrated embodiment, many of the components and features of the retractor 14 are as described with respect to FIGS. 2A and 2B, and like numbers are therefore used to identify like components. In the embodiment illustrated in FIG. 7, S2 illustratively includes a sensor 122 mounted to the frame 52 of the retractor 14 or to another stationary component of the retractor 14. The shaft 56''' is illustratively depicted in FIG. 7 as having a toothed wheel or gear 92 mounted thereto as described with respect to FIG. 5, although it will be understood that the teeth defined about the outer periphery of the wheel 92 may be omitted alternate embodiments the wheel 92. In any case, the wheel 92 illustratively has four spaced apart magnets $124_1$-$124_4$ affixed to or integrated into the planar face thereof such that the magnets $124_1$-$124_4$ rotate with the wheel 92 about the shaft 56''', although it will be understood that more or fewer such magnets may be affixed to the wheel 92 in alternate embodiments.

The sensor 122 illustrated in FIG. 7 is illustratively a conventional Hall-effect sensor configured to produce a magnet detection signal each time one of the magnets $124_1$-$124_4$ disposed radially about the gear 92 passes within a detection distance of the sensor 114. In this regard, the position of the sensor 122 relative to the face of the wheel 92 is illustratively selected so as to be able to discriminate passage thereby of the magnets $124_1$-$124_4$ from the spaces between the magnets $124_1$-$124_4$. In alternate embodiments, other conventional magnet detection sensor technologies or other conventional sensor technologies may be implemented, examples of which may include, but are not limited to, capacitive sensors, inductive sensors and the like.

The instructions stored in the memory 24 illustratively include instructions which, when executed by the processor 22, cause the processor 22 to monitor the sensor 122 to determine detection thereby of individual ones of the magnets $124_1$-$124_4$ spaced about the gear or wheel 92 as just described, and to determine that the "threshold length of web," as described above in the sequence detection of S1, S2, S3, is paid out of the web retractor 14 if a threshold number of magnet detections are produced by the sensor 122. Illustratively, the threshold number of magnet detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal produced by the sensor 122 to determine detection thereby of individual ones of the magnets $124_1$-$124_4$ spaced about the gear or wheel 92 as just described, determining or estimating the amount, i.e., length, of the web 16 that is paid out of the retractor 14 as a function of the number of magnet detections produced by the sensor 122, and then comparing the determined or estimated length of the paid out portion of the web 16 to a threshold web length value.

Figure 8A:
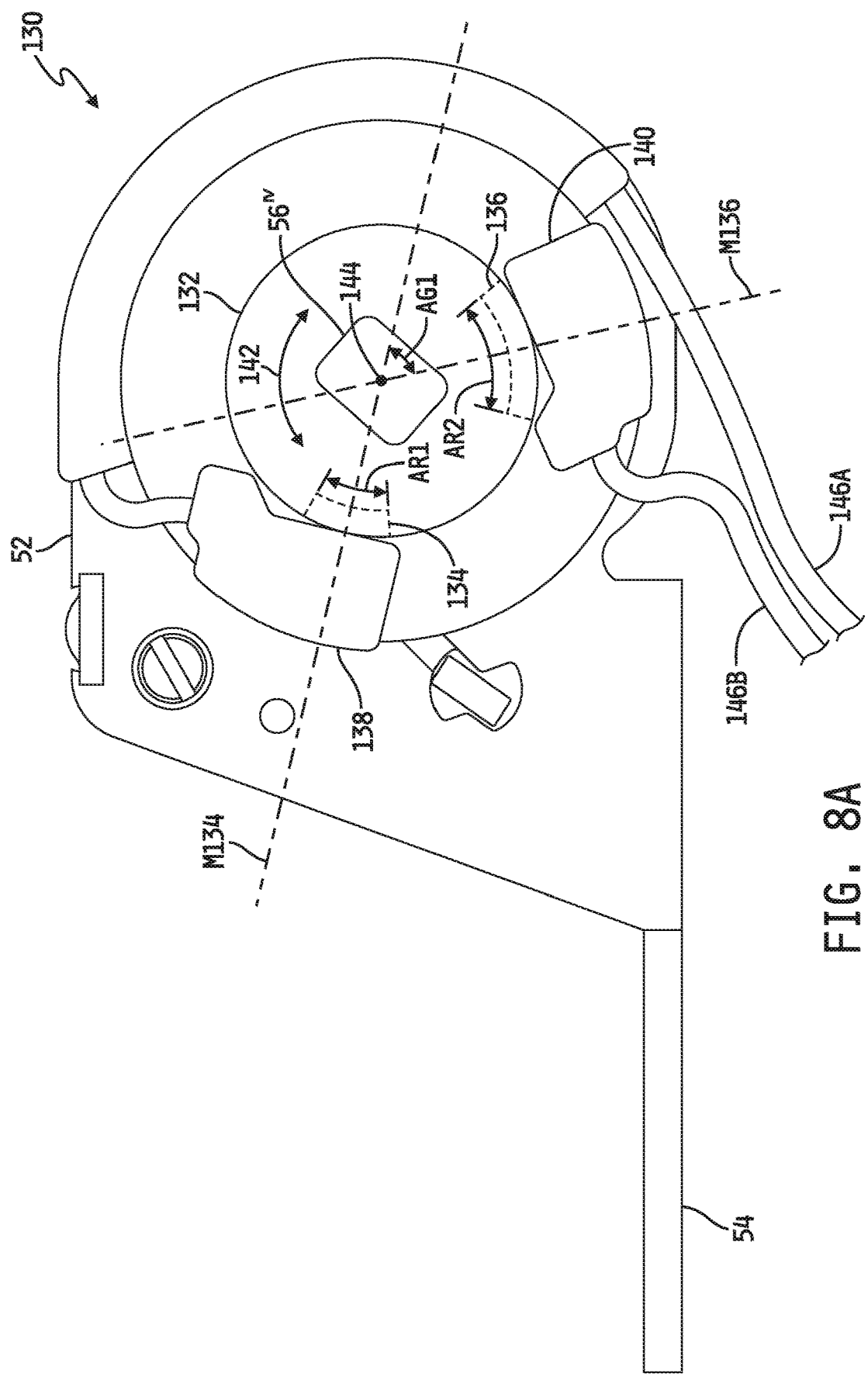
FIG. 8A is a simplified diagram of still a further embodiment of the retractor assembly depicted in FIG. 1 including an embodiment having multiple web movement sensors.
Figure 8B:
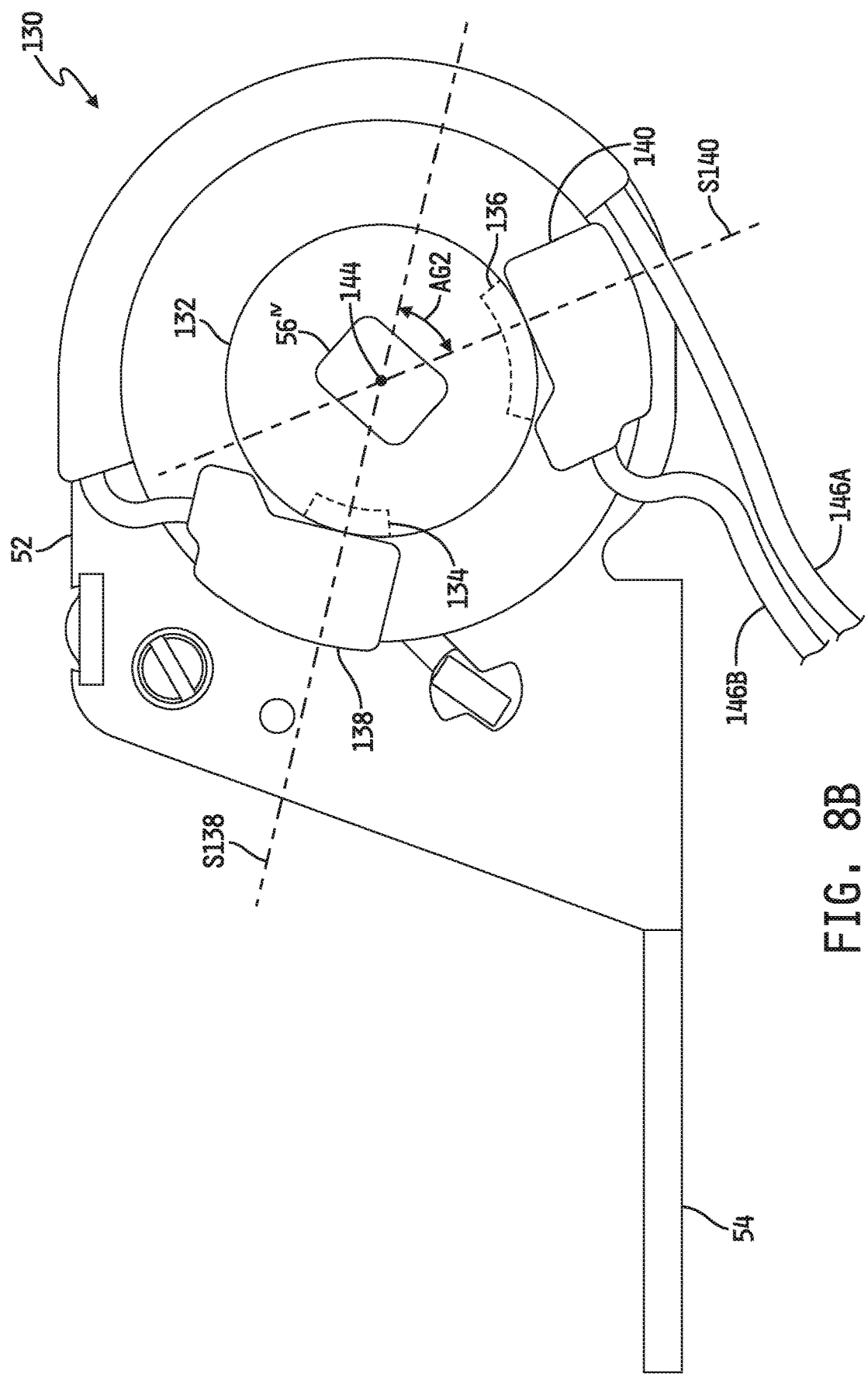
FIG. 8B is a simplified diagram identical to FIG. 8A showing additional features of the illustrated retractor embodiment.

Referring now to FIGS. 8A and 8B, yet another embodiment is shown of a retractor assembly 130 in which the sensor S2 implemented in the retractor 14 in the form of two shaft, wheel or gear rotation sensors. In the illustrated embodiment, many of the components and features of the retractor 14 are as described with respect to FIGS. 2A and 2B, and like numbers are therefore used to identify like components. In the embodiment illustrated in FIGS. 8A and 8B, S2 illustratively includes two sensors 138, 140 each mounted to the frame 52 of the retractor 14 or to another stationary component of the retractor 14. Illustratively, the sensors 138, 140 are radially spaced apart from one another relative to and about the rotatable shaft $56^{IV}$ as shown.

The shaft $56^{IV}$ is illustratively depicted in FIGS. 8A and 8B as having a wheel or gear 132 mounted such that the wheel or gear 132 rotates with the shaft $56^{IV}$ about a rotational axis 144 of the shaft $56^{IV}$. Two arc-shaped magnets 134, 136 are defined at or adjacent to the outer periphery of the wheel 132, and the magnets 134, 136 are radially spaced apart from one another relative to the rotational axis 144. In one embodiment, pockets are formed into the periphery of the wheel 132, and the magnets 134, 136 are inserted and secured therein. Alternatively, the magnets 134, 136 may be affixed or integrated into the wheel 132 using any conventional technique(s). In the illustrated embodiment, the arc-shaped magnets 134, 136 each define different arc lengths AR1, AR2 respectively, wherein AR2>AR1 as illustrated in FIG. 8A. Additionally, as also illustrated in FIG. 8A, a magnet axis M134 passing through the rotational axis 144 of the shaft $56^{IV}$ and centrally through the magnet 134 (i.e., such that M134 bi-sects the arc length AR1) and a magnet axis M136 passing through the rotational axis 144 of the shaft $56^{IV}$ and centrally through the magnet 136 (i.e., such that M136 bi-sects the arc length AR2) form an acute angle AG1 therebetween (and also form an obtuse angle therebetween adjacent to the acute angle AG1).

The sensors 138, 140 are, like the magnets 134, 136, radially spaced apart from one another relative to the rotational axis 144 of the shaft $56^{IV}$. As illustrated in FIG. 8B, a sensor axis S138 passing through the rotational axis 144 of the shaft $56^{IV}$ and centrally through the active surface of the sensor 138 facing the wheel 132 and a sensor axis S140 passing through the rotational axis 144 of the shaft $56^{IV}$ and centrally through the active surface of the sensor 140 facing the wheel 132 form another acute angle AG2 therebetween (and also form an obtuse angle therebetween adjacent to the acute angle AG2). Illustratively, the angles AG1 and AG2 are different from one another, although embodiments are contemplated in which AG1=AG2. In any case, at least one signal path 146A is connected between the sensor 138 and the processor 22, and at least one signal path 146B is connected between the sensor 140 and the processor 22.

In the illustrated embodiment, the sensors 138, 140 are illustratively conventional Hall-effect sensors each configured to produce a magnet detection signal each time one of the magnets 134, 136 passes within a detection distance thereof. In this regard, each sensor 138, 140 is positioned relative to the face of the wheel 132 so as to be able to discriminate passage thereby of the magnets 134, 136 from the spaces between the magnets 134, 136. In alternate embodiments, the magnets 134, 136 may have other shapes, i.e., shapes other than arcs, and/or may be positioned adjacent to the outer periphery of the wheel 132, i.e., at least partially inboard. In some such embodiments, the sensors 138, 140 may extend over (or under) the wheel 132 as viewed in the two-dimensional depiction illustrated in FIGS. 8A and 8B. In alternate embodiments, other conventional magnet detection sensor technologies or other conventional sensor technologies may be implemented, examples of which may include, but are not limited to, capacitive sensors, inductive sensors and the like.

In one embodiment, the instructions stored in the memory 24 illustratively include instructions which, when executed by the processor 22, cause the processor 22 to monitor the sensors 138, 140 to determine detection by each of passage thereby of individual ones of the magnets 134, 136 spaced about the gear or wheel 132 as just described, and to determine that the "threshold length of web," as described above in the sequence detection of S1, S2, S3, is paid out of the web retractor 14 if a threshold number of magnet detections are produced by one or both of the sensors 138, 140. Illustratively, the threshold number of magnet detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal(s) produced by either of both of the sensors 138, 140 to determine detection thereby of individual ones of the magnets 134, 136 spaced about the gear or wheel 132 as just described, determining or estimating the amount, i.e., length, of the web 16 that is paid out of the retractor 14 as a function of the number of magnet detections produced by either or both of the sensors 138, 140, and then comparing the determined or estimated length of the paid out portion of the web 16 to a threshold web length value.

In some embodiments, the signals produced by the two sensors 138, 140 may be processed by the processor 22 to determine both rotational information, i.e., the number of full and/or partial rotations of the shaft $56^{IV}$ and directional information, i.e., whether the shaft $56^{IV}$ is rotating in a clockwise or counterclockwise direction. In such embodiments, the instructions stored in the memory 24 illustratively include instructions which, when executed by the processor 22, cause the processor 22 to process the signals produced by the sensors 138, 140 to determine the number of rotations and/or partial rotations of the shaft $56^{IV}$ as well as the direction of rotation of the shaft $56^{IV}$, and to determine that the "threshold length of web," as described above in the sequence detection of S1, S2, S3, is paid out of the web retractor 14 if, based on such rotation amount and rotational direction information, the processor 22 determines that the shaft $56^{IV}$ has rotated at least a threshold amount, i.e., at least a predefined number of rotations and/or partial rotations, in the web payout direction. Illustratively, the threshold rotation amount (in the web payout direction) will be chosen to correlate to a desired threshold length of the web 16 paid out by the retractor 14 in the web payout direction. In alternative embodiments, the instructions stored in the memory 24 may include instructions which, when executed by the processor 22, cause the processor 22 to determine that the "threshold length of web" is paid out of the web retractor 14 by processing the signal(s) produced by the sensors 138, 140 to estimate or otherwise determine a length of web paid out of the retractor 14 based on such rotation amount and rotational direction information, and to determine that "the threshold length of web" is paid out of the retractor 14 if the estimated or otherwise determined length of web meets or exceeds a threshold web length value.

Figure 9A:
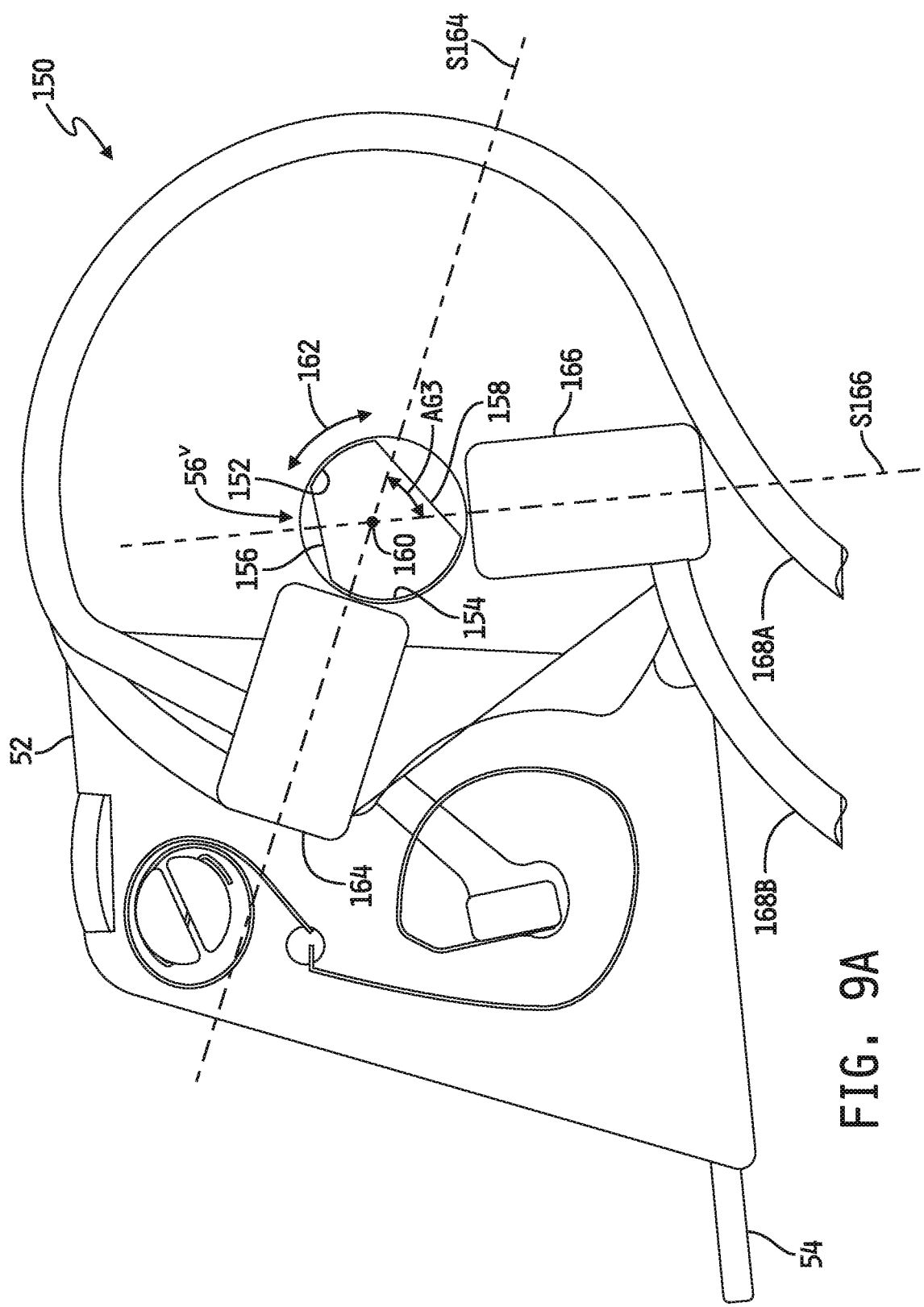
FIG. 9A is a simplified diagram of another embodiment of the retractor assembly depicted in FIG. 1 including another embodiment having multiple web movement sensors.
Figure 9B:
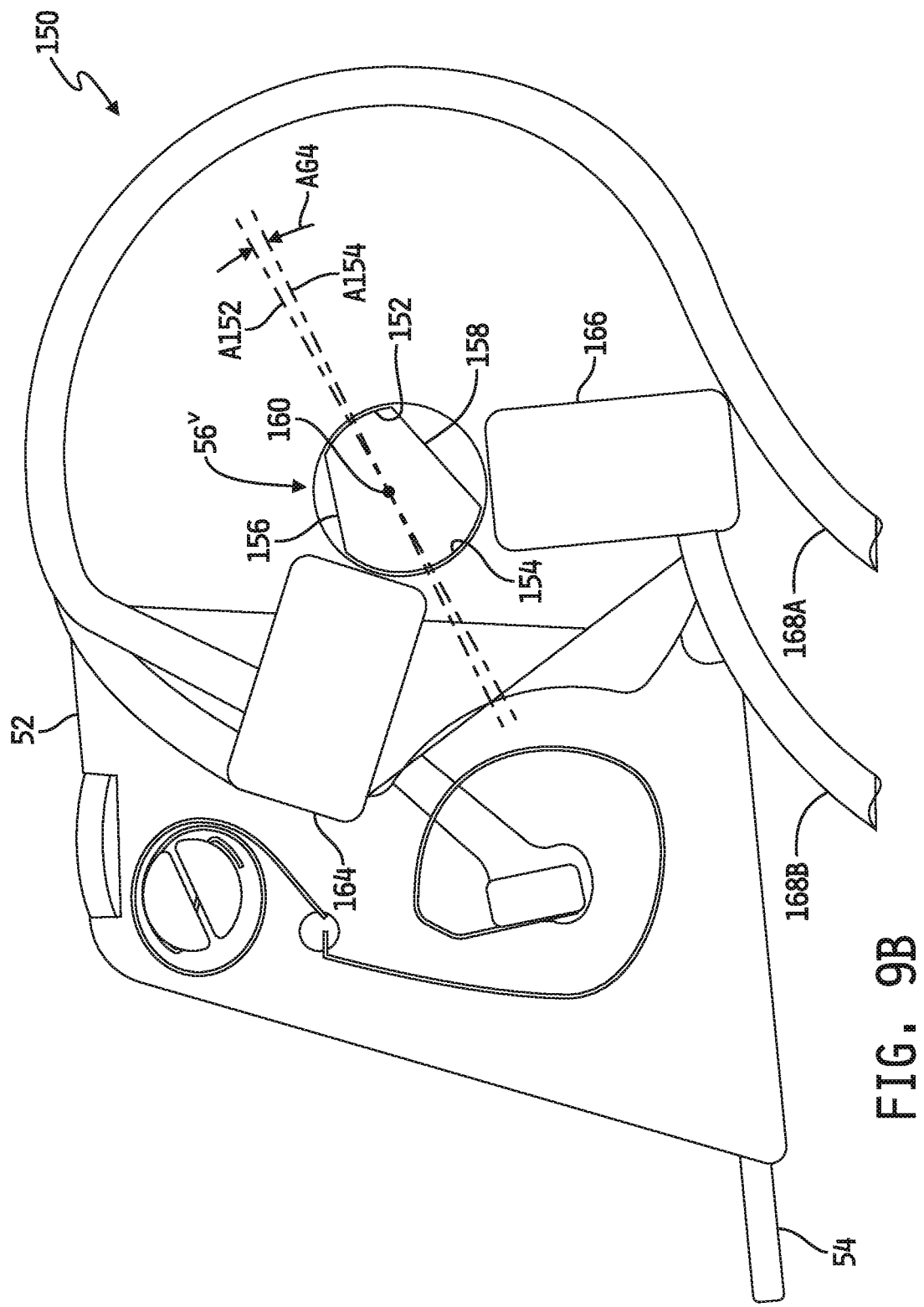
FIG. 9B is a simplified diagram identical to FIG. 9A showing additional features of the illustrated retractor embodiment.

Referring now to FIGS. 9A and 9B, still another embodiment is shown of a retractor assembly 150 in which the sensor S2 implemented in the retractor 14 in the form of two shaft, wheel or gear rotation sensors. In the illustrated embodiment, many of the components and features of the retractor 14 are as described with respect to FIGS. 2A and 2B, and like numbers are therefore used to identify like components. In the embodiment illustrated in FIGS. 9A and 9B, S2 illustratively includes two sensors 164, 166 each mounted to the frame 52 of the retractor 14 or to another stationary component of the retractor 14. Illustratively, the sensors 164, 166 are radially spaced apart from one another relative to and about the rotatable shaft $56^V$ as shown.

The shaft $56^V$ is illustratively depicted in FIGS. 9A and 9B as having a two arc-shaped ends or lobes 152, 154 generally opposite one another with each set of opposing arc ends joined together by generally opposite linear walls 156, 158. The shaft $56^V$ is illustratively rotatable about a rotational axis 160 in either of the directions 162 depicted in FIG. 9A. In the illustrated embodiment, the arc-shaped magnets 152, 154 each define different arc lengths between the walls 156, 158, wherein the arc length of the arc-shaped end 154 is greater than the arc length of the arc-shaped end 152. As illustrated by example in FIG. 9B, an arc axis A152 passing through the rotational axis 160 of the shaft $56^V$ and centrally through the arc-shaped end 152 (i.e., such that A152 bi-sects the arc length of the arc-shaped end 152) and an arc axis A154 passing through the rotational axis 160 of the shaft $56^V$ and centrally through the arc-shaped end 154 (i.e., such that A154 bi-sects the arc-shaped end 154) form an acute angle AG4 therebetween.

The sensors 164, 166 are, like the arc-shaped ends 152, 154 of the rotatable shaft $56^V$, radially spaced apart from one another relative to the rotational axis 160 of the shaft $56^V$. As illustrated in FIG. 9A, a sensor axis S164 passing through the rotational axis 160 of the shaft $56^V$ and centrally through the active surface of the sensor 164 facing the shaft $56^V$ and a sensor axis S166 passing through the rotational axis 160 of the shaft $56^V$ and centrally through the active surface of the sensor 166 facing the shaft $56^V$ form another acute angle AG3 therebetween (and also form an obtuse angle therebetween adjacent to the acute angle AG3). Illustratively, the angles AG3 and AG4 are different from one another, although embodiments are contemplated in which AG3=AG4. In any case, at least one signal path 168A is connected between the sensor 164 and the processor 22, and at least one signal path 168B is connected between the sensor 166 and the processor 22.

In the illustrated embodiment, the sensors 164, 166 are illustratively conventional proximity sensors each configured to produce a lobe detection signal each time one of the arc-shaped ends or lobes 152, 154 of the shaft $56^V$ passes within a detection distance thereof. In this regard, each sensor 164, 166 is positioned relative to the shaft $56^V$ so as to be able to discriminate passage thereby of each of the arc-shaped ends or lobes 152, 154 from the side walls 156, 158 thereof. In alternate embodiments, the ends 152, 154 of the shaft $56^V$ may have other shapes, i.e., shapes other than arcs. In alternate embodiments, other conventional sensor technologies or may be implemented, examples of which may include, but are not limited to, capacitive sensors, inductive sensors, magnetic sensors, and the like.

In one embodiment, the instructions stored in the memory 24 illustratively include instructions which, when executed by the processor 22, cause the processor 22 to monitor the sensors 164, 166 to determine detection by each of passage thereby of individual ones of the arc-shaped ends or lobes 152, 154 of the rotatable shaft $56^V$, and to determine that the "threshold length of web," as described above in the sequence detection of S1, S2, S3, is paid out of the web retractor 14 if a threshold number of lobe detections are produced by one or both of the sensors 164, 166. Illustratively, the threshold number of lobe detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal(s) produced by either of both of the sensors 164, 166 to determine detection thereby of individual ones of the lobes 152, 154, determining or estimating the amount, i.e., length, of the web 16 that is paid out of the retractor 14 as a function of the number of lobe detections produced by either or both of the sensors 164, 166, and then comparing the determined or estimated length of the paid out portion of the web 16 to a threshold web length value.

In some embodiments, the signals produced by the two sensors 164, 166 may be processed by the processor 22 to determine both rotational information, i.e., the number of full and/or partial rotations of the shaft $56^V$ and directional information, i.e., whether the shaft $56^V$ is rotating in a clockwise or counterclockwise direction. In such embodiments, the instructions stored in the memory 24 illustratively include instructions which, when executed by the processor 22, cause the processor 22 to process the signals produced by the sensors 164, 166 to determine the number of rotations and/or partial rotations of the shaft $56^V$ as well as the direction of rotation of the shaft $56^V$, and to determine that the "threshold length of web," as described above in the sequence detection of S1, S2, S3, is paid out of the web retractor 14 if, based on such rotation amount and rotational direction information, the processor 22 determines that the shaft $56^V$ has rotated at least a threshold amount, i.e., at least a predefined number of rotations and/or partial rotations, in the web payout direction. Illustratively, the threshold rotation amount (in the web payout direction) will be chosen to correlate to a desired threshold length of the web 16 paid out by the retractor 14 in the web payout direction. In alternative embodiments, the instructions stored in the memory 24 may include instructions which, when executed by the processor 22, cause the processor 22 to determine that the "threshold length of web" is paid out of the web retractor 14 by processing the signal(s) produced by the sensors 164, 166 to estimate or otherwise determine a length of web paid out of the retractor 14 based on such rotation amount and rotational direction information, and to determine that "the threshold length of web" is paid out of the retractor 14 if the estimated or otherwise determined length of web meets or exceeds a threshold web length value.

Figure 10:
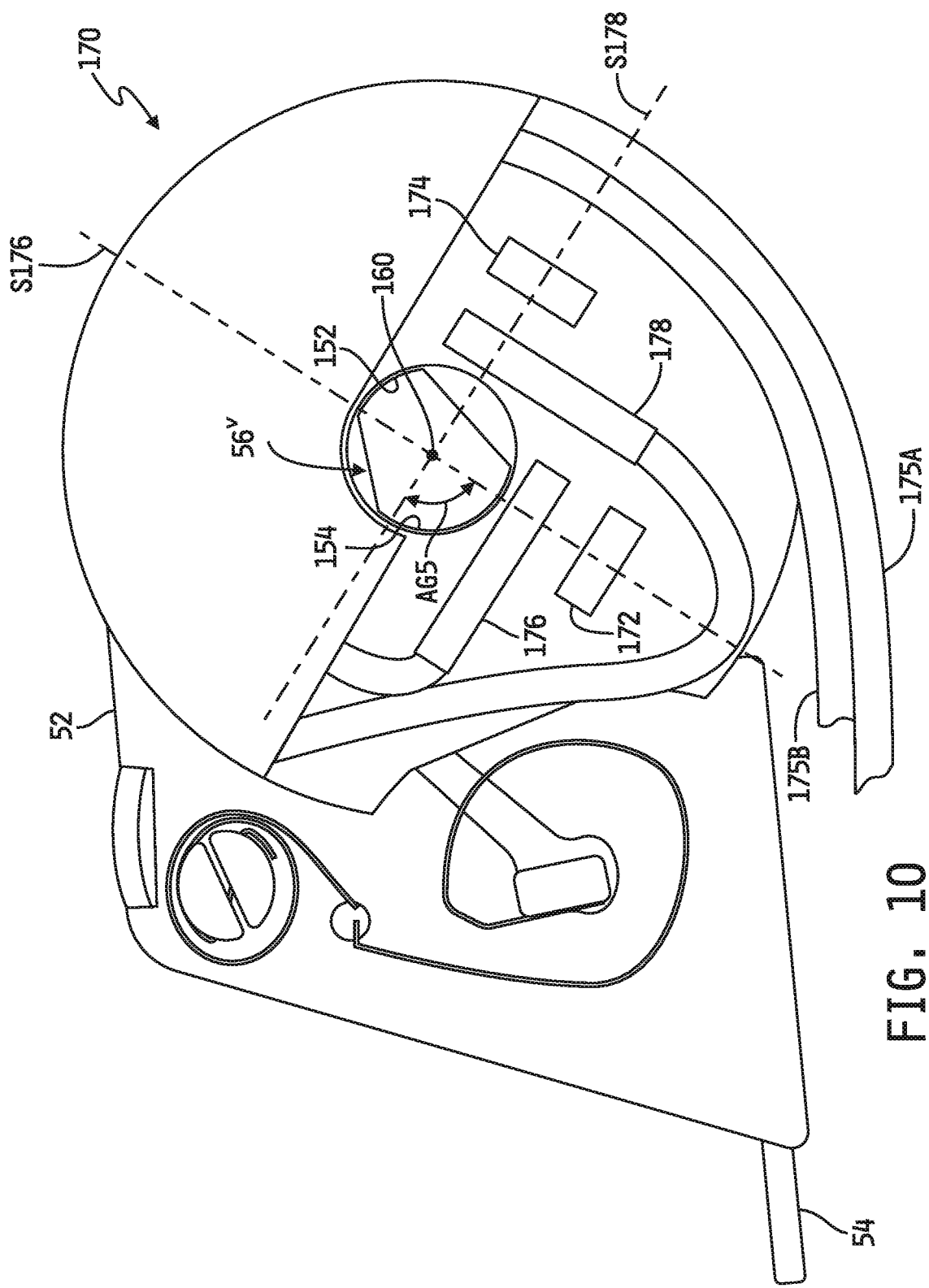
FIG. 10 is a simplified diagram of yet another embodiment of the retractor assembly depicted in FIG. 1 including yet another embodiment having multiple web movement sensors.

Referring now to FIG. 10, a further embodiment is shown of a retractor assembly 170 in which the sensor S2 implemented in the retractor 14 in the form of two shaft, wheel or gear rotation sensors. In the illustrated embodiment, many of the components and features of the retractor 14 are as described with respect to FIGS. 2A and 2B, and like numbers are therefore used to identify like components. In the embodiment illustrated in FIG. 10, the rotatable shaft $56^V$ is identical to the shaft $56^V$ of FIGS. 9A and 9B and described above, and like numbers are therefore used to identify like components.

In the illustrated embodiment, S2 illustratively includes two sensors 176, 178 each mounted to the frame 52 of the retractor 14 or to another stationary component of the retractor 14. The sensors 176, 178 are radially spaced apart from one another relative to the rotational axis 160 of the shaft $56^V$. Two magnets 172, 174 are also mounted to the frame 52 of the retractor 14 or to another stationary component of the retractor 14. One of the magnets 172 is positioned adjacent to the sensor 176 such that the sensor 176 is positioned between the magnet 172 and the shaft $56^V$, and the other magnet 174 is positioned adjacent to the sensor 178 such that the sensor 178 is positioned between the magnet 174 and the shaft $56^V$. The magnets 172, 174 are thus, like the sensors 176, 178, radially spaced apart from each another relative to the rotational axis 160 of the shaft $56^V$.

As illustrated in FIG. 10, a sensor axis S176 passes through the rotational axis 160 of the shaft $56^V$, centrally through the active surface of the sensor 176 facing the shaft $56^V$ and centrally through the magnet 172. Another sensor axis S178 passes through the rotational axis 160 of the shaft $56^V$, centrally through the active surface of the sensor 178 facing the shaft $56^V$ and centrally through the magnet 174. The sensor axes S176 and S178 illustratively form an acute angle AG5 therebetween (and also form an obtuse angle therebetween adjacent to the acute angle AG5), although in other embodiments AG5 may be a right angle. Illustratively, the angles AG4 and AG5 are different from one another, although embodiments are contemplated in which AG4=AG5. In any case, at least one signal path 175A is connected between the sensor 176 and the processor 22, and at least one signal path 175B is connected between the sensor 178 and the processor 22.

In the illustrated embodiment, the sensors 176, 178 are illustratively conventional Hall-effect sensors each configured to produce a magnet detection signal each time one of the arc-shaped ends or lobes 152, 154 of the shaft $56^V$ passes within a detection distance thereof. In this regard, the differently-shaped lobes 152, 154 are metal or metal-coated so as to affect the magnetic fields produced by the magnets 172, 174 differently. Accordingly, each sensor 176, 178 is able to discriminate passage thereby of each of the arc-shaped ends or lobes 152, 154 from each other and from the side walls 156, 158 thereof. In alternate embodiments, the ends 152, 154 of the shaft $56^V$ may have other shapes, i.e., shapes other than arcs. In alternate embodiments, other conventional sensor technologies or may be implemented, examples of which may include, but are not limited to, capacitive sensors, inductive sensors, magnetic sensors, and the like.

In one embodiment, the instructions stored in the memory 24 illustratively include instructions which, when executed by the processor 22, cause the processor 22 to monitor the sensors 176, 178 to determine detection by each of passage thereby of individual ones of the arc-shaped ends or lobes 152, 154 of the rotatable shaft $56^V$, and to determine that the "threshold length of web," as described above in the sequence detection of S1, S2, S3, is paid out of the web retractor 14 if a threshold number of lobe detections are produced by one or both of the sensors 176, 178. Illustratively, the threshold number of lobe detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal(s) produced by either of both of the sensors 176, 178 to determine detection thereby of individual ones of the lobes 152, 154, determining or estimating the amount, i.e., length, of the web 16 that is paid out of the retractor 14 as a function of the number of lobe detections produced by either or both of the sensors 176, 178, and then comparing the determined or estimated length of the paid out portion of the web 16 to a threshold web length value.

In some embodiments, the signals produced by the two sensors 176, 178 may be processed by the processor 22 to determine both rotational information, i.e., the number of full and/or partial rotations of the shaft $56^V$ and directional information, i.e., whether the shaft $56^V$ is rotating in a clockwise or counterclockwise direction. In such embodiments, the instructions stored in the memory 24 illustratively include instructions which, when executed by the processor 22, cause the processor 22 to process the signals produced by the sensors 176, 178 to determine the number of rotations and/or partial rotations of the shaft $56^V$ as well as the direction of rotation of the shaft $56^V$, and to determine that the "threshold length of web," as described above in the sequence detection of S1, S2, S3, is paid out of the web retractor 14 if, based on such rotation amount and rotational direction information, the processor 22 determines that the shaft $56^V$ has rotated at least a threshold amount, i.e., at least a predefined number of rotations and/or partial rotations, in the web payout direction. Illustratively, the threshold rotation amount (in the web payout direction) will be chosen to correlate to a desired threshold length of the web 16 paid out by the retractor 14 in the web payout direction. In alternative embodiments, the instructions stored in the memory 24 may include instructions which, when executed by the processor 22, cause the processor 22 to determine that the "threshold length of web" is paid out of the web retractor 14 by processing the signal(s) produced by the sensors 176, 178 to estimate or otherwise determine a length of web paid out of the retractor 14 based on such rotation amount and rotational direction information, and to determine that "the threshold length of web" is paid out of the retractor 14 if the estimated or otherwise determined length of web meets or exceeds a threshold web length value.

Figure 11:
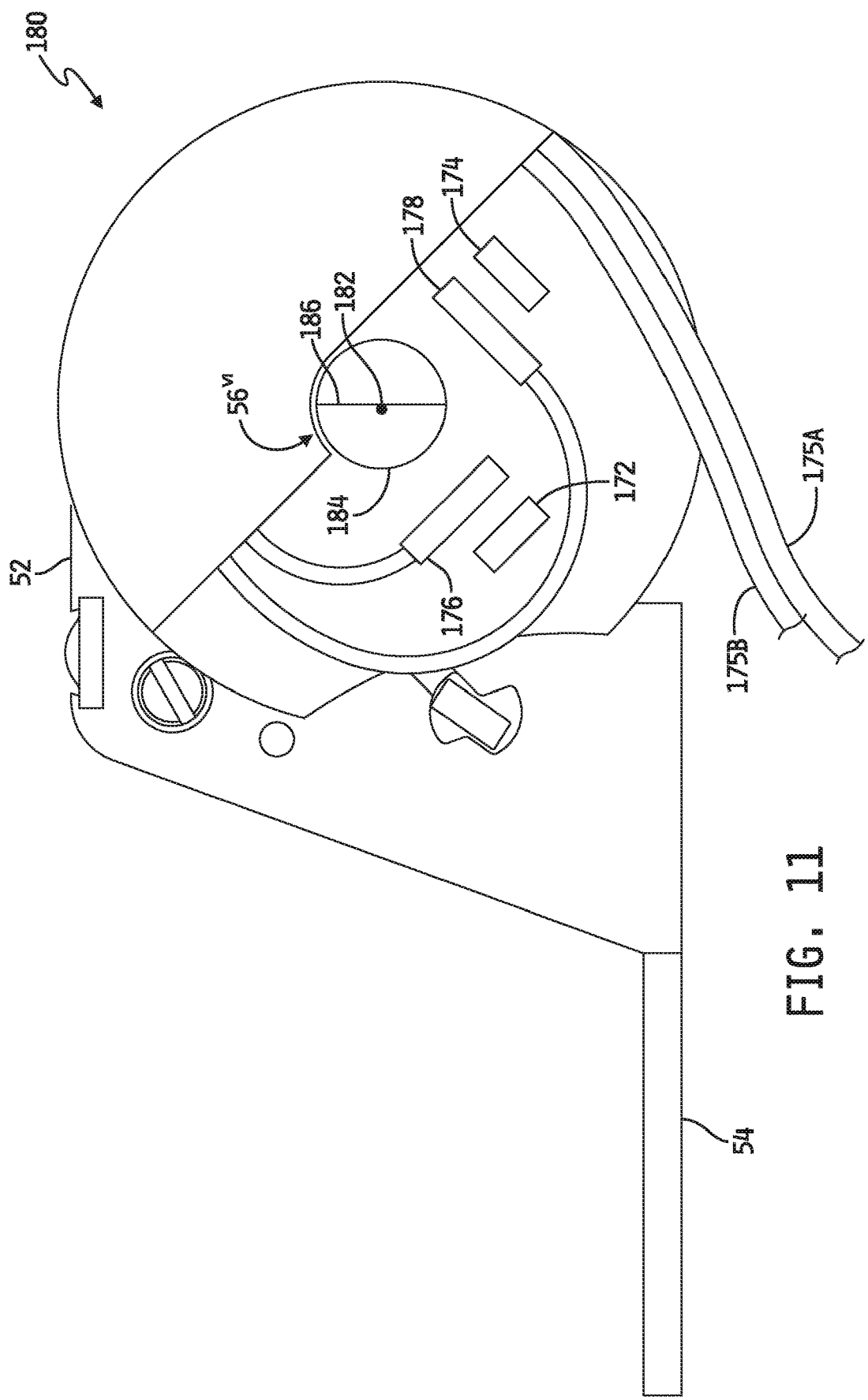
FIG. 11 is a simplified diagram of still another embodiment of the retractor assembly depicted in FIG. 1 including yet another embodiment having multiple web movement sensors.

Referring now to now to FIG. 11, still another embodiment is shown of a retractor assembly 180 in which the sensor S2 implemented in the retractor 14 in the form of two shaft, wheel or gear rotation sensors. In the illustrated embodiment, many of the components and features of the retractor 14 are as described with respect to FIGS. 2A and 2B, and like numbers are therefore used to identify like components. In the embodiment illustrated in FIG. 11, the sensors 176, 178 and the magnets 172, 174 are identical to those illustrated in FIG. 10 and described above, and like numbers are therefore used to identify like components.

The shaft $56^{VI}$ is illustratively depicted in FIG. 11 as having an arc-shaped end or lobe 184 and a flat or linear end 186 each generally opposite the other. In the illustrated embodiment, the end or lobe 184 has a semi-circular cross section, although in other embodiments the cross section of the end or lobe 184 may include more or less of the circle. The shaft $56^{VI}$ is illustratively rotatable about a rotational axis 182 in either direction. In the illustrated embodiment, each sensor 176, 178 is able to discriminate passage thereby of each of the arc-shaped end or lobe 184 and the flat or linear portion 186 from each other.

In one embodiment, the instructions stored in the memory 24 illustratively include instructions which, when executed by the processor 22, cause the processor 22 to monitor the sensors 176, 178 to determine detection by each of passage thereby of individual ones of the arc-shaped end or lobe 184 and the flat or linear portion 186 of the rotatable shaft 56$^{VI}$, and to determine that the "threshold length of web," as described above in the sequence detection of S1, S2, S3, is paid out of the web retractor 14 if a threshold number of lobe detections are produced by one or both of the sensors 176, 178. Illustratively, the threshold number of lobe detections will be chosen to correlate to a desired threshold length of the web 16. In alternative embodiments, the instructions stored in the memory 24 may include instructions which, when executed by the processor 22, cause the processor 22 to determine that the "threshold length of web" is paid out of the web retractor 14 by processing the signal(s) produced by either of both of the sensors 176, 178 to determine detection thereby of individual ones of the lobes 152, 154, determining or estimating the amount, i.e., length, of the web 16 that is paid out of the retractor 14 as a function of the number of lobe detections produced by either or both of the sensors 176, 178, and then comparing the determined or estimated length of the paid out portion of the web 16 to a threshold web length value.

In some embodiments, the signals produced by the two sensors 176, 178 may be processed by the processor 22 to determine both rotational information, i.e., the number of full and/or partial rotations of the shaft 56$^{VI}$ and directional information, i.e., whether the shaft 56$^{VI}$ is rotating in a clockwise or counterclockwise direction. In such embodiments, the instructions stored in the memory 24 illustratively include instructions which, when executed by the processor 22, cause the processor 22 to process the signals produced by the sensors 176, 178 to determine the number of rotations and/or partial rotations of the shaft 56$^{VI}$ as well as the direction of rotation of the shaft 56$^{VI}$, and to determine that the "threshold length of web," as described above in the sequence detection of S1, S2, S3, is paid out of the web retractor 14 if, based on such rotation amount and rotational direction information, the processor 22 determines that the shaft 56$^{VI}$ has rotated at least a threshold amount, i.e., at least a predefined number of rotations and/or partial rotations, in the web payout direction. Illustratively, the threshold rotation amount (in the web payout direction) will be chosen to correlate to a desired threshold length of the web 16 paid out by the retractor 14 in the web payout direction. In alternative embodiments, the instructions stored in the memory 24 may include instructions which, when executed by the processor 22, cause the processor 22 to determine that the "threshold length of web" is paid out of the web retractor 14 by processing the signal(s) produced by the sensors 176, 178 to estimate or otherwise determine a length of web paid out of the retractor 14 based on such rotation amount and rotational direction information, and to determine that "the threshold length of web" is paid out of the retractor 14 if the estimated or otherwise determined length of web meets or exceeds a threshold web length value.

Figure 12:
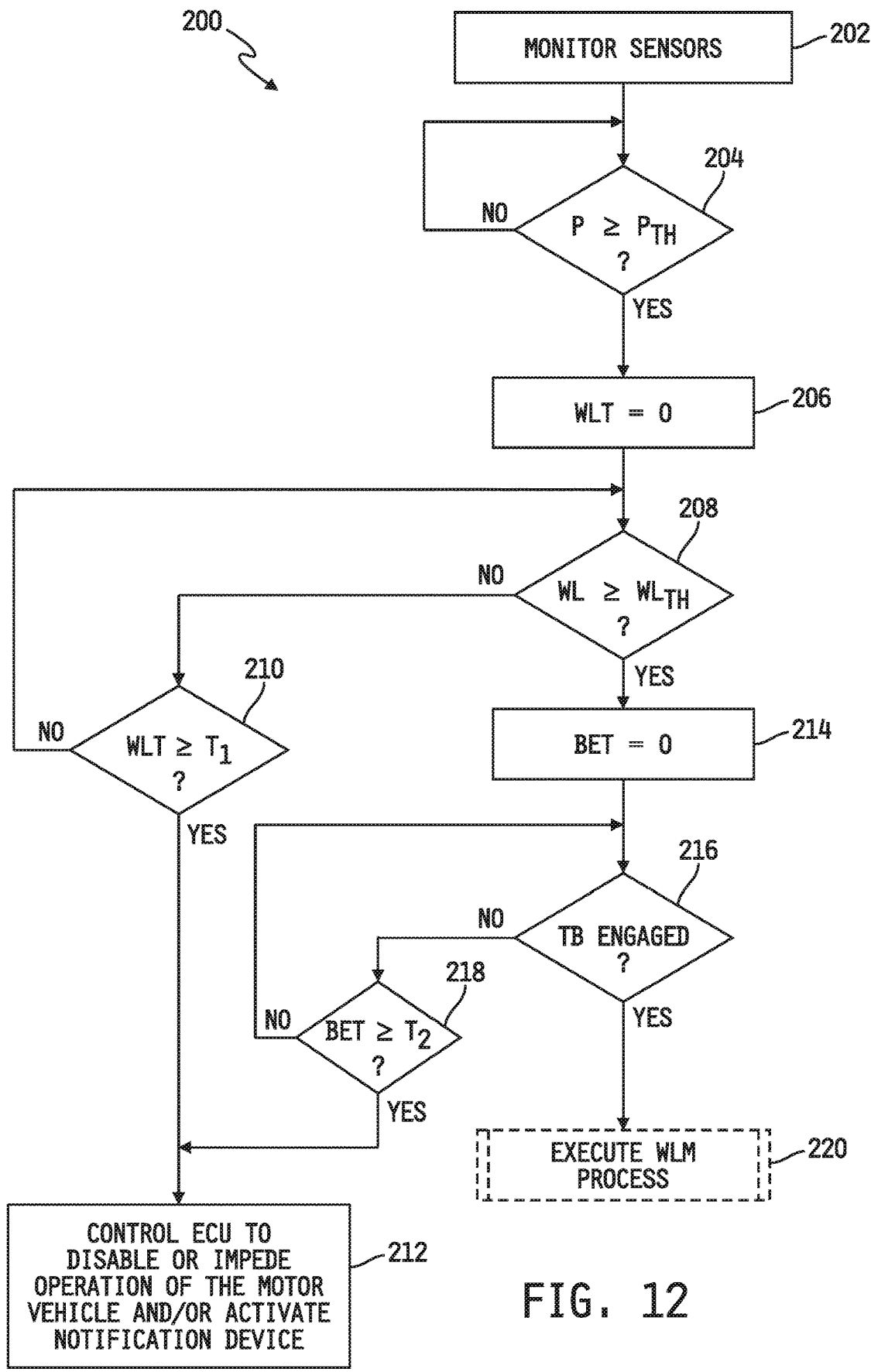
FIG. 12 is a simplified flowchart illustrating an embodiment of a process for detecting and acting upon an operating state of the restraint system depicted in FIG.

Referring now to FIG. 12, a simplified flowchart is shown of an embodiment of a process 200 for detecting and acting upon an operating state of the restraint system depicted in FIG. 1. Illustratively, the process 200 is stored in the memory 24 in the form of instructions which, when executed by the processor 22, cause the processor to execute the illustrated acts. The process 200 begins at step 202 where the processor 200 is operable to monitor the sensors S1, S2, S3, i.e., to monitor the signals produced by the sensors S1, S2, S3. In the embodiment of the flowchart illustrated in FIG. 12, the sensor S1 is assumed to be a pressure sensor or switch, the sensor S3 is assumed to be a latch sensor or switch, and the sensor(s) S2 may be implemented in any of the forms described above. It will be understood that in alternate embodiments of the process 200, the sensor S1 and/or the sensor S3 may be implemented in other forms, some examples of which are described hereinabove.

In any case, the process 200 advances from step 202 to step 204 where the processor 22 is operable to determine whether the sensor S1 produces a pressure signal, P, that is greater than or equal to a threshold pressure $P_{TH}$. In one embodiment, $P_{TH}$ is selected to correspond or correlate to a pressure above which will be applied to the seat bottom 12A when an average-sized adult is seated in the occupant seat 12. In other embodiments, $P_{TH}$ may be selected to have a greater or lesser value. If, at step 204, the processor 22 determines that P is less than $P_{TH}$, the process 200 loops back to the beginning of step 204. If, on the other hand, the processor 22 determines at step 204 that P≥$P_{TH}$, the process 200 advances to step 206 where the processor 22 is illustratively operable to reset a web length timer, WLT, e.g., to set the timer WLT equal to zero or other constant value.

Thereafter at step 208, the processor 22 is operable to determine from the sensor signal(s) produced by the sensor(s) S2 whether the web length, WL, paid out of the retractor 14 is greater than or equal to a web length threshold value WL $T_H$. Illustratively, the web length threshold value $WL_{TH}$ is selected to take into account the combination of the linear distance between the tongue 18 and the buckle 20 when the web 16 is fully retracted within the web retractor 14 and an additional length of the web 16 required to wrap at least partially about an average-sized adult seated in the occupant seat 12.

Figure 13:
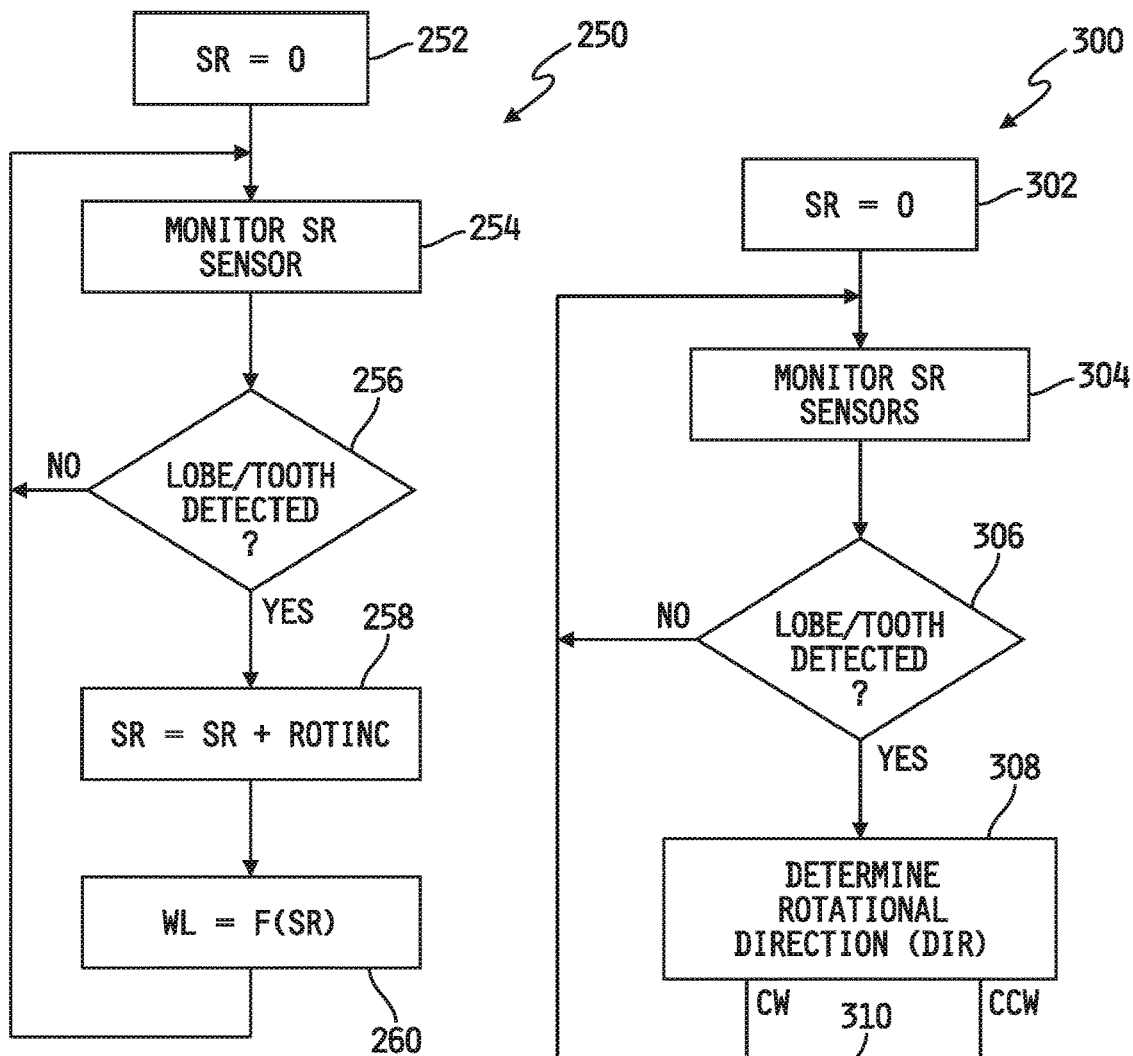
FIG. 13 is a simplified flowchart illustrating an embodiment of a process for carrying out step 208 of the process illustrated in FIG. 12.
Figure 14:
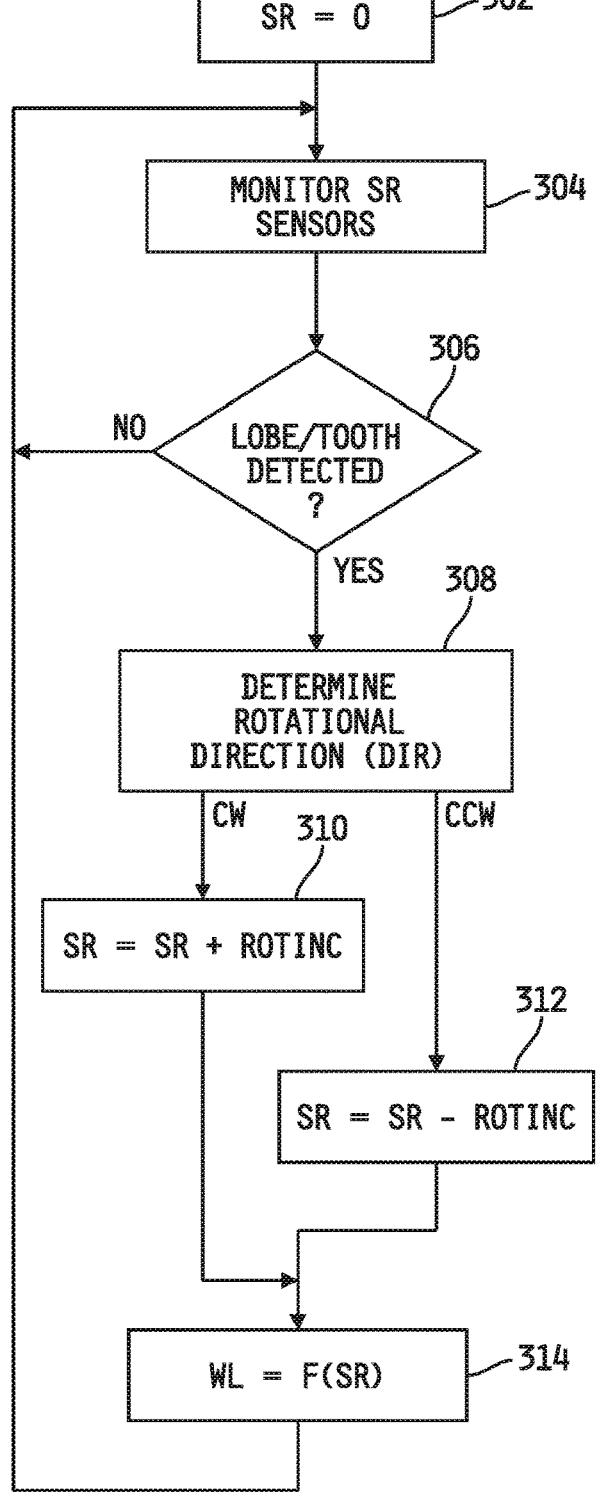
FIG. 14 is a simplified flowchart illustrating another embodiment of a process for carrying out step 208 of the process illustrated in FIG. 12.

Examples of execution by the processor 22 of step 208 of the process 200 have been provided hereinabove with respect to each of the embodiments of the web retractor 14 illustrated in FIGS. 2A-11. Additional example processes that may be executed by the processor 22 at step 208 are illustrated in FIGS. 13 and 14 which will be described in detail below. In any case, if the processor 22 determines at step 208 that WL is less than $WL_{TH}$, the process 200 advances to step 210 where the processor 22 is operable to determine whether the web length timer WLT, which was reset at step 206, has advanced to a time value greater than or equal to a threshold time value $T_1$. Illustratively, $T_1$ is in the range of 1-20 seconds, although in other embodiments $T_1$ may alternatively be less than 1 second or greater than 20 seconds. If the processor 22 determines at step 210 that WLT is less than $T_1$, the process 200 loops back to the beginning of step 208. If, however, the processor 22 determines at step 210 that WLT $T_1$, the process 200 advances to step 212 where the processor 22 is operable to produce the control signal(s) OUT1 and/or OUT2 to disable or impede operation of the motor vehicle and/or to activate a notification device 30 and/or to control the wireless communication circuitry 32, in embodiments which include such circuitry 32, to transmit a wireless control signal to activate one or more remote notification devices 34 or to control one or more remote notification devices 34 to display a message or report, all as described hereinabove. Thus, after the processor 22 determines at step 204 that an occupant has been seated in the occupant seat 12, the occupant must draw at least the threshold length $WL_{TH}$ of web 16 from the retractor 14 within the time period $T_1$ or step 212 will be executed by the processor 22.

If, at step 214, the processor 22 determines that WL $WL_{TH}$ within the time period $T_1$, the process 200 advances to step 214 where the processor 22 is illustratively operable to reset a buckle engagement timer, BET, e.g., to set the timer BET equal to zero or other constant value. Thereafter at step 216, the processor 22 is operable to determine from the sensor signal produced by the sensor S3 whether the tongue 18 and the buckle 20 have engaged one another as described above. If not, the process 200 advances to step 218 where the processor 22 is operable to determine whether the buckle engagement timer BET, which was reset at step 214, has advanced to a time value greater than or equal to a threshold time value $T_2$. In one embodiment, $T_2=T_1$, although in alternate embodiments $T_2$ may be selected such that $T_2 \neq T_1$. If the processor 22 determines at step 218 that BET is less than $T_2$, the process 200 loops back to the beginning of step 216. If, however, the processor 22 determines at step 218 that BET $T_2$, the process 200 advances to step 212 where the processor 22 is operable as described above. Thus, after the processor 22 determines at step 204 that an occupant has been seated in the occupant seat 12, and thereafter determines that at least the threshold length of web $WL_{TH}$ was drawn from the retractor within the time period $T_1$ after detection of the occupant being seated in the occupant seat 12, the occupant engage the tongue 18 with the buckle 20 within the time period $T_2$ or step 212 will be executed by the processor 22.

If, at step 216, the processor 22 determines that the tongue 18 and buckle 20 have engaged one another within the time period $T_2$, the processor 22 does not execute step 212, and the processor 22 therefore does not produce any control signals to disable or impede operation of the motor vehicle, to activate any on-board notification devices 30 or to activate or otherwise control any remote notification devices 34. Thus, if the processor 22 determines that at least the threshold length of web $WL_{TH}$ is drawn from the retractor 14 within the time period $T_1$ after detection of the occupant being seated in the occupant seat 12, and then determines that the tongue 18 and buckle 20 have engaged one another within the time period $T_2$ after determining that the threshold length of web $WL_{TH}$ was drawn from the retractor 14, the motor vehicle operates in a normal manner and no notification devices are activated or otherwise controlled by the processor 22.

In some of the example web retractor assembly embodiments just described with respect to FIGS. 2A-11, the shaft rotation sensor(s) implemented therein are capable of detecting small amounts of movement of the web 16 that typically and expectedly occurs as a result of movement of the occupant within the vehicle seat 12, e.g., due to movement of the motor vehicle itself and/or due to the operation of one or more hydraulically/pneumatically or PTO-driven attachments. Detection of such small amounts of movement of the web 16 relative to the retractor 14 may illustratively be used to distinguish between a properly deployed web 16, i.e., in which the web 16 extends about and engages the occupant, and an improperly deployed web, e.g., in which the tongue 18 is engaged with the buckle 20 with the web 16 located between the occupant and the seat 12 or with the web 16 otherwise not engaging the occupant. In such embodiments, the processor 22 may illustratively be programmed, e.g., via appropriate instructions stored in the memory 24, to continue to monitor S2 following the YES branch of step 216. During such subsequent monitoring, the processor 22 may continue to monitor S2 and to produce the control signal(s) OUT1 and/or OUT2 if the signal produced by S2 does not indicate a threshold amount of movement of the web 16 relative to the web retractor 14, e.g., over some time period.

Figure 17:
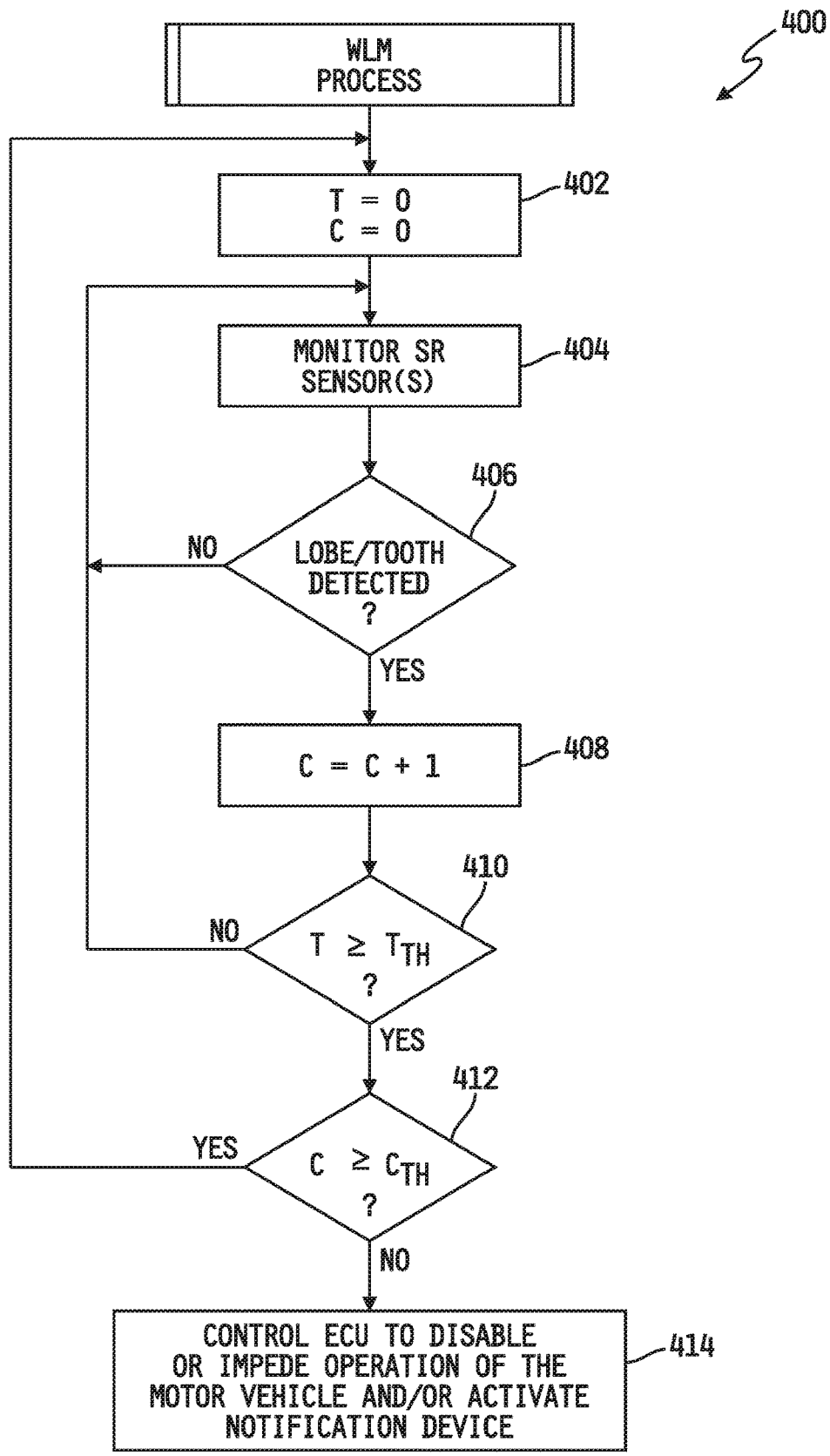
FIG. 17 is a simplified flowchart illustrating an embodiment of a process for carrying out step 220 of the process illustrated in FIG. 12.

In some such embodiments, for example, the process 200 may include an additional step 220 following the YES branch of step 216. In such embodiments, the processor 22 is illustratively operable at step 220 to execute a web length monitoring process. If the sequence of events determined at steps 204-218 have occurred so as to arrive at the YES branch of step 218, the restraint harness 15 should be extended over at least a portion of the occupant while seated in the occupant seat 12. If so, then during subsequent operation of the motor vehicle, small amounts of the web 16 should be expected to move into and out of the web retractor 14 as the motor vehicle encounters bumps and/or turns, and/or as the operation of attachments 28 to hydraulic, pneumatic and/or PTO-driven control units 26 jostle or otherwise move the motor vehicle, so as to cause the occupant of the seat 12 to move into and away from the web 16. In embodiments that include step 220 of the process 200, the processor 22 is illustratively operable to monitor the sensor(s) S2 to determine whether an expected amount of such movement of the web 16 occurs. One example of a web length monitoring process that may be executed by the processor 22 at step 220 is illustrated in FIG. 17 and will be described in detail below.

Referring now to FIG. 13, an embodiment is shown of a process 250 for executing step 208 of the process 200 illustrated in FIG. 12. The process 250 may be executed at step 208 of the process 200 when implementing any of the embodiments of the web retractor 14 illustrated in FIGS. 2A-11. In embodiments that include it, the process 250 is illustratively stored in the memory 24 in the form of instructions which, when executed by the processor 22, cause the processor 22 to carry out the illustrated acts. The process 250 begins at step 252 where the processor 22 is operable to reset a shaft rotation value, SR, e.g., to set SR equal to zero or other constant value. Thereafter at step 254, the processor 22 is operable to monitor the shaft rotation sensor(s) S2, and at step 256 the processor 22 is operable to determine, based on the sensor signal(s), whether a lobe or tooth is detected as described above. If not, the process 250 loops back to the beginning of step 254. If, at step 256, the processor 22 determines that a lobe or tooth is detected, the process 250 advances to step 258 where the processor 22 is operable to add a rotation increment value, ROTINC, to the current shaft rotation value, SR. The rotation increment value, ROTINC, illustratively corresponds to an incremental amount of rotation of the retractor shaft between the lobe(s) or teeth defined on the shaft, gear or wheel of the particular retractor. For example, the retractor assembly 50 illustrated in FIGS. 2A and 2B defines a single lobe 56A on the rotatable shaft 56, and in this embodiment the rotation increment value, ROTINC, is equal to one complete rotation of the shaft 56. As another example, the retractor assembly 90 illustrated in FIG. 5 defines 44 teeth along the periphery of the gear 92, and in this embodiment the rotation increment value, ROTINC, is equal to $\frac{1}{44}$ rotation of the shaft 56'''.

Following step 258, the process 250 illustratively advances to step 260 where the processor 22 is operable to compute a web length, WL, as a function of the current shaft rotation value, SR. Illustratively, this function may compute WL as a function of SR and a combination of the diameter of the rotatable shaft (or spool) and an additional diameter of an average or estimated number of windings of the web 16 about the shaft (or spool). In other embodiments, the function computed at step 260 may include other factors such as the thickness of the web 16, the reduction in the diameter of the combination of the shaft (or spool) and web 16 wrapped around the shaft (or spool) as the web 16 is paid out of the retractor, and the like. In any case, the process 250 illustratively loops from step 260 back to step 254.

In some embodiments of the process 250, step 260 may be omitted, and in such embodiments the processor 22 may be operable at step 208 of the process 200 to compare SR to a shaft rotation threshold value $SR_{TH}$ in place of comparing WL to $WL_{TH}$. In other such embodiments, the processor 22 may be operable at step 208 to compute WL as a function of SR and to then execute the comparison of WL with $WL_{TH}$.

Referring now to FIG. 14, an embodiment is shown of another process 300 for executing step 208 of the process 200 illustrated in FIG. 12. The process 300 may illustratively be executed at step 208 of the process 200 when implementing any of the embodiments of the web retractor 14 that include two or more shaft rotation sensors from which shaft rotation amount and shaft rotation direction can be determined; e.g., when implementing any of the embodiments of the web retractor 14 illustrated in FIGS. 8A-11. In embodiments that include it, the process 300 is illustratively stored in the memory 24 in the form of instructions which, when executed by the processor 22, cause the processor 22 to carry out the illustrated acts. The process 300 begins at step 302 where the processor 22 is operable to reset a shaft rotation value, SR, e.g., to set SR equal to zero or other constant value. Thereafter at step 304, the processor 22 is operable to monitor the shaft rotation sensor(s) S2, and at step 306 the processor 22 is operable to determine, based on the sensor signal(s), whether a lobe or tooth is detected as described above. If not, the process 300 loops back to the beginning of step 304. If, at step 306, the processor 22 determines that a lobe or tooth is detected, the process 300 advances to step 308 where the processor 22 is operable to determine a rotational direction (DIR) of the rotatable shaft, e.g., a clockwise (CW) or counterclockwise (CCW) rotational direction of the shaft, or a retraction direction, i.e., a rotational direction of the shaft in a web take up direction in which the web 16 is being retracted into the retractor 14, or extraction direction of the shaft, i.e., a rotational direction of the shaft in a web payout direction in which the web 16 is being extracted from the retractor 14.

Figure 15A:
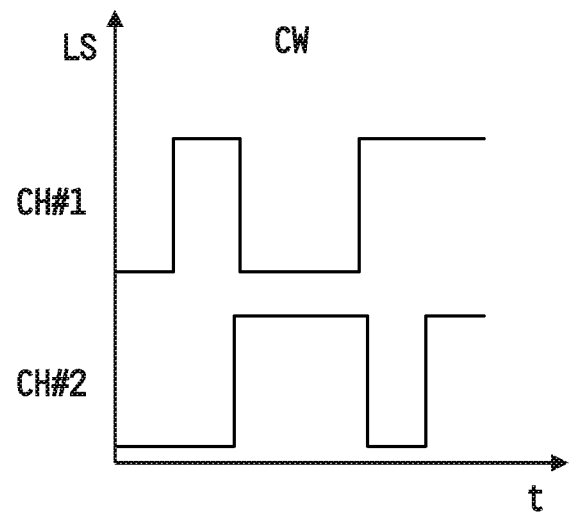
FIGS. 15A and 15B are timing diagrams illustrating an embodiment of a process for carrying out step 308 of the process illustrated in FIG. 14 in embodiments in which the retractor assembly is implemented in the form of any of the examples illustrated in FIGS. 8A-10.
Figure 15B:
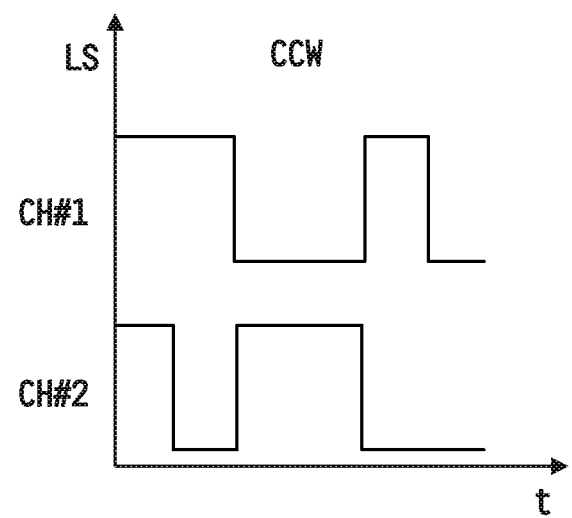

Referring now to FIGS. 15A and 15B, timing diagrams are shown depicting logic states of the outputs of the two sensors in the web retractor assemblies illustrated in FIGS. 8A, 8B, in FIGS. 9A and 9B and in FIG. 10. The sensors 138, 164 and 176 illustratively correspond to CH#1 in FIGS. 15A and 15B, and the sensors 140, 166 and 178 illustratively correspond to CH#2 in FIGS. 15A and 15B. In any case, the processor 22 is illustratively operable at step 308 of the process 300 to monitor the sensor outputs and determine when CH#1 and CH#2 are both at low logic states. When CH#1 then transitions to a high logic state, the logic state of CH#2 determines the direction of rotation. For example, as illustrated in FIG. 15A, when CH#1 and CH#2 are both at low logic states and CH#1 then transitions to a high logic state, CH#2 is at a low logic state, thereby indicating clockwise rotation of the shaft $56^{IV}$, $56^{V}$. Similarly, as illustrated in FIG. 15B, when CH#1 and CH#2 are both at low logic states and CH#1 then transitions to a high logic state, CH#2 is at a high logic state, thereby indicating counterclockwise rotation of the shaft $56^{IV}$, $56^{V}$.

Figure 16A:
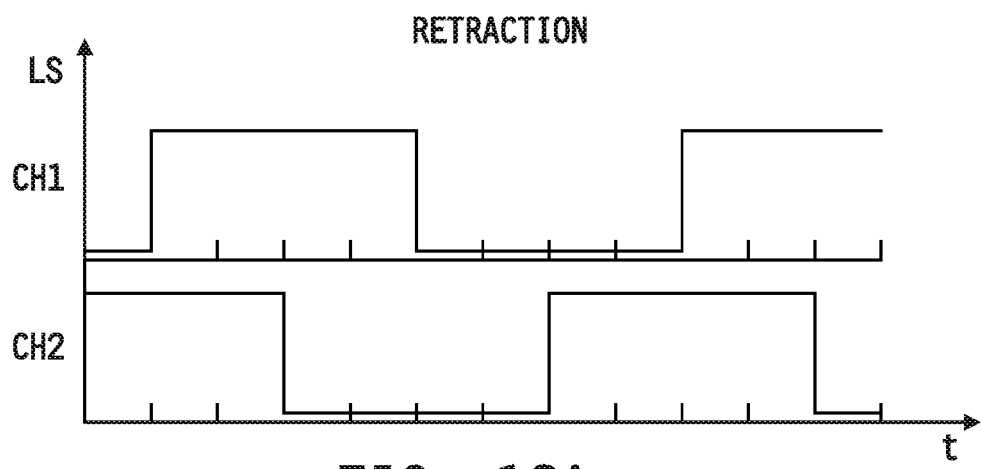
FIGS. 16A and 16B are timing diagrams illustrating an embodiment of a process for carrying out step 308 of the process illustrated in FIG. 14 in embodiments in which the retractor assembly is implemented in the form of the example illustrated in FIG. 11.
Figure 16B:
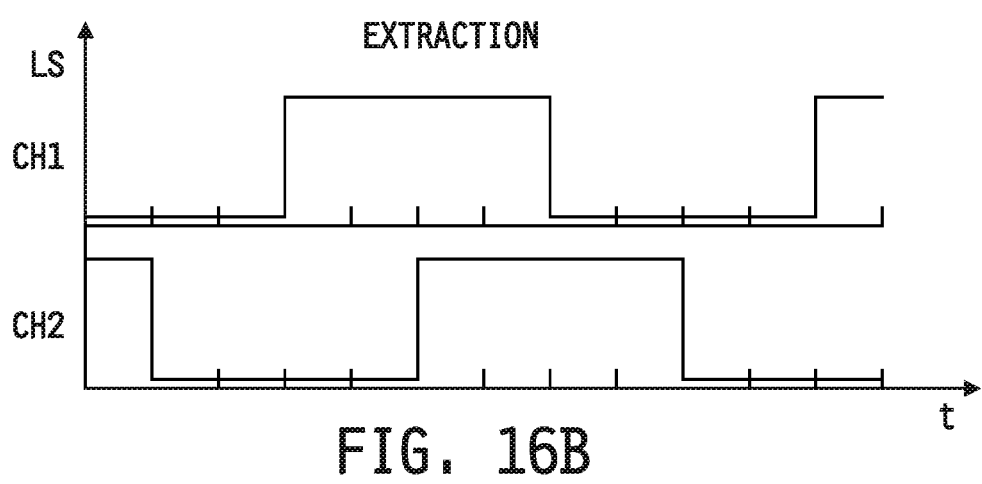

Referring now to FIGS. 16A and 16B, timing diagrams are shown depicting logic states of the outputs of the two sensors in the web retractor assemblies illustrated in FIG. 11. The sensor 176 illustratively corresponds to CH#1 in FIGS. 16A and 16B, and the sensor 178 illustratively corresponds to CH#2 in FIGS. 16A and 16B. In any case, the processor 22 is illustratively operable at step 308 of the process 300 to monitor the sensor outputs and determine when CH#1 and CH#2 are both at low logic states. If CH#2 then transitions to a high logic state while CH#1 remains at a low logic state, as illustrated in FIG. 16A, this indicates rotation of the shaft $56^{VI}$ in a direction in which the web is being extracted from the retractor 14, i.e., the shaft $56^{VI}$ is rotating in the web payout direction. Similarly, as illustrated in FIG. 16B, if CH#1 and CH#2 are both at low logic states and CH#1 then transitions to a high logic state while CH#2 remains at a low logic state, this indicates rotation of the shaft $56^{VI}$ in a direction in which the web is being retracted into the retractor 14, i.e., the shaft $56^{VI}$ is rotating in the web take-up direction.

Referring again to FIG. 14, if the processor 22 determines at step 308 that the retractor shaft is rotating in the clockwise direction, CW, (or in the web extraction direction), the process 300 advances to step 310 where the processor 22 is operable to add a rotation increment value, ROTINC, to the current shaft rotation value, SR. If, on the other hand, the processor 22 determines at step 308 that the retractor shaft is rotating in the counterclockwise direction, CCW, (or in the web retraction direction), the process 300 advances to step 312 where the processor 22 is operable to subtract the rotation increment value, ROTINC, from the current shaft rotation value, SR. Illustratively, SR and ROTINC are as described with respect to FIG. 13. In any case, it should be apparent that with the additional web direction information, the value of SR is more accurately indicative of the amount of web paid out from the retractor than the value of SR determined according to the process 250 illustrated in FIG. 13.

Following either of steps 310 and 312, the process 300 illustratively advances to step 314 where the processor 22 is operable to compute a web length, WL, as a function of the current shaft rotation value, SR. This function is illustratively as described above with respect to FIG. 13, and the process 300 illustratively loops from step 214 back to step 304. In some embodiments of the process 300, step 314 may be omitted, and in such embodiments the processor 22 may be operable at step 208 of the process 200 to compare SR to a shaft rotation threshold value $SR_{TH}$ in place of comparing WL to $WL_{TH}$. In other such embodiments, the processor 22 may be operable at step 208 to compute WL as a function of SR and to then execute the comparison of WL with $WL_{TH}$.

Referring now to FIG. 17, an embodiment is shown of a web length monitoring process 400 in embodiments in which the process 200 illustrated in FIG. 12 includes step 220. In embodiments that include it, the process 400 is illustratively stored in the memory 24 in the form of instructions which, when executed by the processor 22, cause the processor 22 to carry out the illustrated acts. The process 400 begins at step 402 where the processor 22 is operable to reset a timer value, T, and a count value, C, e.g., to set each of T and C equal to zero or other constant value. Thereafter at step 404, the processor 22 is operable to monitor the shaft rotation sensor(s) S2, and at step 406 the processor 22 is operable to determine, based on the sensor signal(s), whether a lobe or tooth is detected as described above. If not, the process 400 loops back to the beginning of step 404. If, at step 406, the processor 22 determines that a lobe or tooth is detected, the process 400 advances to step 408 where the processor 22 is operable to increment the count value, C, by 1 or some other constant value. Thereafter at step 410, the processor 22 is operable to determine whether the timer value, T, has increased to or beyond a threshold time $T_{TH}$. If not, the process 400 loops back to step 404, and otherwise the process 400 advances to step 412 where the processor 22 determines whether the count value, C, meets or exceeds a threshold count value, $C_{TH}$. If so, the process 400 loops back to step 402, and otherwise the process 400 advances to step 414 where the processor 22 executes a step identical to step 212 described in detail above with respect to the process 200 of FIG. 12.

Under the direction of the process 400, the processor 22 is thus operable to determine whether the web 16 moves into and/or out of the retractor 14 a threshold number of times within a specified time period, as should be expected if the web 16 is properly positioned about the occupant of the seat 12. The values of $C_{TH}$ and $T_{TH}$ will typically depend upon the type and use of the motor vehicle in which the restraint system 10 is implemented. In some embodiments, $C_{TH}$ and/or $T_{TH}$ may be static values stored in the memory 24. In other embodiments, $C_{TH}$ and/or $T_{TH}$ may be dynamic values that change depending upon one or more operating conditions of the motor vehicle. For example, in some embodiments the value(s) of $C_{TH}$ and/or $T_{TH}$ may depend upon the moving speed of the motor vehicle, e.g., $C_{TH}$ may decrease and/or $T_{TH}$ may increase with decreasing vehicle speed. As another example, the value(s) of $C_{TH}$ and/or $T_{TH}$ may change with engine speed, e.g., $C_{TH}$ may increase and/or $T_{TH}$ may decrease with increasing engine speed. As yet another example, the value(s) of $C_{TH}$ and/or $T_{TH}$ may change depending upon the operational status of an on-board hydraulic, pneumatic or PTO unit, e.g., $C_{TH}$ may increase and/or $T_{TH}$ may decrease when an on-board hydraulic, pneumatic or PTO unit is activated. Those skilled in the art will recognize that dynamic modification of $C_{TH}$ and/or $T_{TH}$ may be based, at least in part, on other operating conditions of the motor vehicle, and it will be understood that any such dynamic modifications of $C_{TH}$ and/or $T_{TH}$ are contemplated by this disclosure. It will be further understood that the count and time based process 400 illustrated in FIG. 17 is provided only by way of example. Those skilled in the art will recognize other techniques for monitoring incremental movement of the web 16, and some such other techniques may or may not rely on or implement a count value, C, and/or a timer T as implemented in the example illustrated in FIG. 17. It will be understood, however, that any such other techniques for monitoring incremental movement of the web 16 are contemplated by, and are intended to fall within the scope of, this disclosure.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A restraint system for an occupant seat mounted in a motor vehicle, the restraint system comprising:
    a restraint harness having at least one web,
    a web retractor configured to be mounted to the occupant seat or a support surface to which the occupant seat is mounted within the motor vehicle, the web retractor having a rotatable shaft about which the at least one web is wound when retracting into the web retractor and from which the at least one web is unwound when being paid out of the web retractor,
    one of a tongue or buckle coupled to the at least one web, the other of the tongue or buckle configured to be mounted to one of the occupant seat or the support surface to which the occupant seat is mounted within the motor vehicle, the tongue and the buckle configured to releasably engage one another to restrain an occupant in the occupant seat with the restraint harness,
    a first sensor configured to produce a first signal corresponding to detection of an occupant being seated in the occupant seat,
    at least one second sensor operatively coupled to the web retractor and configured to produce at least one second signal corresponding to rotation of the rotatable shaft,
    a third sensor configured to produce a third signal corresponding to detection of engagement of the tongue with the buckle, and
    a processor including a memory having instructions stored therein which, when executed by the processor, cause the processor to produce at least one control signal configured to control at least one of an electronically controllable unit to disable or impede operation of the motor vehicle and a notification device to produce a notification unless, in sequence, the first sensor produces the first signal followed by the at least one second signal produced by the at least one second sensor indicating that the rotatable shaft of the web retractor has rotated by at least a threshold amount followed by the third sensor producing the third signal,
    wherein the instructions stored in the memory further include instructions which, when executed by the processor, cause the processor to produce the at least one control signal if the at least one second signal produced by the at least one second sensor does not indicate that the rotatable shaft of the web retractor has rotated by at least the threshold rotational amount within a first time period following production of the first signal by the first sensor.

2. The restraint system of claim 1, wherein the motor vehicle includes an accelerator pedal movable between idle and full throttle positions and the electronically controllable unit in the form of a fuel system operatively coupled to an engine of the motor vehicle,
    and wherein the at least one control signal produced by the processor causes the fuel system to limit rotational speed of the engine to an engine idle speed regardless of accelerator pedal position.

3. The restraint system of claim 1, wherein the motor vehicle includes the electronically controllable unit in the form of an ignition system operatively coupled to an engine of the motor vehicle,
    and wherein the at least one control signal produced by the processor disables operation of the ignition system so that the engine will not start.

4. The restraint system of claim 1, wherein the motor vehicle includes the electronically controllable unit in the form of an ignition system operatively coupled to an engine of the motor vehicle,
    and wherein the at least one control signal produced by the processor causes the ignition system to shut down the engine.

5. The restraint system of claim 1, wherein the motor vehicle includes the electronically controllable unit in the form of an electronically controlled transmission operatively coupled to an engine of the motor vehicle,
    and wherein the at least one control signal produced by the processor disables shifting of the transmission.

6. The restraint system of claim 1, wherein the motor vehicle includes the electronically controllable unit in the form of an electronically controlled transmission operatively coupled to an engine of the motor vehicle, and wherein the at least one control signal produced by the processor disables engagement of a drive gear of the transmission.

7. The restraint system of claim 1, wherein the motor vehicle includes the electronically controllable unit in the form of an electronically controlled hydraulic actuator operatively coupled to one or more hydraulically actuated attachments, and wherein the at least one control signal produced by the processor disables operation of the electronically controlled hydraulic actuator or operation of at least one of the one or more hydraulically actuated attachments.

8. The restraint system of claim 1, wherein the motor vehicle includes the electronically controllable unit in the form of a power take off (PTO) unit operatively coupled to an engine of the motor vehicle and to one or more PTO-driven attachments, and wherein the at least one control signal produced by the processor disables operation of the electronically controlled power take off unit or operation of at least one of the one or more PTO-driven attachments.

9. The restraint system of claim 1, wherein the motor vehicle includes the notification device mounted therein, and wherein instructions stored in the memory include instructions which, when executed by the processor, cause the processor to produce the at least one control signal to activate the notification device to produce the notification in the form of at least one of a visual, audible and tactile indicator unless the first sensor produces the first signal followed by the at least one second signal produced by the at least one second sensor indicating that the rotatable shaft of the web retractor has rotated by at least the threshold rotational amount followed by the third sensor producing the third signal.

10. The restraint system of claim 1, further comprising the notification device in the form of a remote notification device located remotely from the motor vehicle, and wherein the processor further includes or is operatively coupled to a wireless communication circuit, and wherein the instructions stored in the memory further include instructions which, when executed by the processor, cause the processor to control the wireless communication circuit to wirelessly communicate the at least control signal to the remote notification device.

11. The restraint system of claim 10, wherein the remote notification device is configured to be responsive to the at least one wirelessly communicated control signal to produce at least one of a visual, audible and tactile indicator or to produce at least one of a notification message and a report.

12. The restraint system of claim 1, wherein the instructions stored in the memory further include instructions which, when executed by the processor, cause the processor to produce the at least one control signal if the third sensor does not produce the third signal within a second time period following indication by the at least one second signal produced by the at least one second sensor that the rotatable shaft of the web retractor has rotated by at least the threshold rotational amount.

13. The restraint system of claim 1, wherein the occupant seat includes a seat bottom configured to support the occupant, and wherein the first sensor is a pressure sensor configured to produce the first signal if an amount of downward pressure acting on the seat bottom exceeds a threshold pressure or a pressure switch calibrated produce the first signal if the downward pressure acting on the seat bottom exceeds the threshold pressure.

14. The restraint system of claim 1, wherein the third sensor is a latch switch carried by the tongue or buckle and configured to produce the third signal when the tongue and buckle engage one another.

15. The restraint system of claim 1, wherein the at least one second sensor comprises a retractor switch mounted within the web retractor and configured to produce the at least one second signal in the form of a switch signal, and wherein the web retractor further comprises at least one lobe protruding radially away from the rotatable shaft, and a follower operatively coupled between and engaging each of the retractor switch and the rotatable shaft such that the follower rides on the rotatable shaft and controls the switch signal to a first state when the follower is engaging the at least one lobe and to a second state when the follower is not engaging the at least one lobe, and wherein the instructions stored in the memory include instructions which, when executed by the processor, cause the processor to monitor the switch signal and to determine that the rotatable shaft of the web retractor has rotated by at least the threshold amount if the switch signal changes between the first and second states a threshold number of times, wherein the threshold amount of rotation of the rotatable shaft corresponds to a threshold amount of the at least one web being paid out of the web retractor.

16. The restraint system of claim 1, wherein the at least one second sensor comprises a retractor switch mounted within the web retractor and configured to produce the at least one second signal in the form of a switch signal, and wherein the web retractor further comprises a toothed gear rotatably mounted to the rotatable shaft, and a follower operatively coupled between and engaging each of the retractor switch and the toothed gear such that the follower rides on the toothed gear and controls the switch signal to a first state when the follower engages the toothed gear between two adjacent teeth thereof and to a second state when the follower engages a tooth of the toothed gear, and wherein the instructions stored in the memory include instructions which, when executed by the processor, cause the processor to monitor the state of the retractor switch and to determine that the rotatable shaft of the web retractor has rotated by at least the threshold amount if the switch signal changes between the first and second states a threshold number of times, wherein the threshold amount of rotation of the rotatable shaft corresponds to a threshold amount of the at least one web being paid out of the web retractor.

17. The restraint system of claim 1, wherein the web retractor further comprises at least one lobe protruding radially away from the rotatable shaft, and wherein the at least one second sensor comprises a proximity sensor mounted within the web retractor adjacent to the rotatable shaft, the proximity sensor configured to produce the at least one second signal in the form of a lobe detection signal each time the at least one lobe passes within a detection distance of the proximity sensor, and wherein the instructions stored in the memory include instructions which, when executed by the processor, cause the processor to monitor the proximity sensor and to determine that the rotatable shaft of the web retractor has rotated by at least the threshold amount if the proximity sensor produces a threshold number of lobe detection signals, wherein the threshold amount of rotation of the rotatable shaft corresponds to a threshold amount of the at least one web being paid out of the web retractor.

18. The restraint system of claim 1, wherein the web retractor further comprises a toothed gear rotatably mounted to the rotatable shaft, and
and wherein the at least one second sensor comprises a proximity sensor mounted within the web retractor adjacent to the toothed gear, the proximity sensor configured to produce the at least one second signal in the form of a tooth detection signal each time a tooth of the toothed gear passes within a detection distance of the proximity sensor,
and wherein the instructions stored in the memory include instructions which, when executed by the processor, cause the processor to monitor the proximity sensor and to determine that the rotatable shaft of the web retractor has rotated by at least the threshold amount if the proximity sensor produces a threshold number of lobe detection signals, wherein the threshold amount of rotation of the rotatable shaft corresponds to a threshold amount of the at least one web being paid out of the web retractor.

19. The restraint system of claim 1, wherein the web retractor further comprises a wheel mounted to the rotatable shaft such that the wheel rotates with the shaft, the wheel including a plurality of spaced-apart magnets each radially positioned on and along one face thereof,
and wherein the at least one second sensor comprises a Hall-effect sensor mounted within the web retractor and positioned to detect passage thereby of each of the plurality of spaced-apart magnets as the wheel rotates with the rotatable shaft, the Hall-effect sensor configured to produce the at least one second signal in the form of a magnet detection signal each time one of the plurality of spaced-apart magnets passes within a detection distance of the Hall-effect sensor,
and wherein the instructions stored in the memory include instructions which, when executed by the processor, cause the processor to monitor the Hall-effect sensor and to determine that the rotatable shaft of the web retractor has rotated by at least the threshold amount if the Hall-effect sensor produces a threshold number of magnet detection signals, wherein the threshold amount of rotation of the rotatable shaft corresponds to a threshold amount of the at least one web being paid out of the web retractor.

20. The restraint system of claim 1, wherein the at least one second signal comprises a plurality of second signals, and wherein the web retractor further comprises a wheel mounted to the rotatable shaft such that the wheel rotates with the shaft, the wheel including two spaced-apart magnets having different sized detection surface positioned on or adjacent to an outer periphery thereof, a first one of the two magnets spaced radially apart from a second one of the two magnets by a first acute or obtuse angle relative to a rotational axis of the rotatable shaft,
and wherein the at least one second sensor comprises a first Hall-effect sensor mounted within the web retractor and positioned relative to the rotatable shaft to detect passage thereby of each of the two spaced-apart magnets as the wheel rotates with the rotatable shaft, the first Hall-effect sensor configured to produce a first one of the plurality of second signals in the form of a first magnet detection signal each time the first one of the two spaced-apart magnets passes within a detection distance of the first Hall-effect sensor and a second one of the plurality of second signals in the form of a second magnet detection signal each time the second one of the two spaced-apart magnets passes within the detection distance of the first Hall-effect sensor, and a second Hall-effect sensor mounted within the web retractor and positioned relative to the rotatable shaft to detect passage thereby of each of the two spaced-apart magnets as the wheel rotates with the rotatable shaft, the second Hall-effect sensor spaced radially apart from the first Hall-effect sensor by a second acute or obtuse angle relative to the rotational axis of the rotatable shaft, the second Hall-effect sensor configured to produce a third one of the plurality of second signals in the form of a third magnet detection signal each time the first one of the two spaced-apart magnets passes within a detection distance of the second Hall-effect sensor and a fourth one of the plurality of second signals in the form of a fourth magnet detection signal each time the second one of the two spaced-apart magnets passes within the detection distance of the second Hall-effect sensor,
and wherein the instructions stored in the memory include instructions which, when executed by the processor, cause the processor to process the first, second, third and fourth magnet detection signals to determine an amount of rotation of the rotatable shaft and a direction of rotation of the rotatable shaft, and to determine that the rotatable shaft has rotated at least the threshold amount if the amount of rotation of the rotatable shaft in the direction of payout of the at least one web from the web retractor meets or exceeds the threshold amount of rotation, wherein the threshold amount of rotation of the rotatable shaft corresponds to a threshold amount of the at least one web being paid out of the web retractor.

21. The restraint system of claim 1, wherein the at least one second signal comprises a plurality of second signals, and wherein the web retractor further comprises two spaced-apart and different sized lobes each protruding radially away from the rotatable shaft, a first one of the two lobes spaced radially apart from a second one of the two lobes sensor by a first acute or obtuse angle relative to a rotational axis of the rotatable shaft, a first magnet mounted within the web retractor and a second magnet mounted within the web retractor and spaced apart from the first magnet,
and wherein the at least one second sensor comprises a first Hall-effect sensor mounted within the web retractor between the first magnet and the rotatable shaft and configured to detect a magnetic change when either of the two spaced-apart lobes of the rotatable shaft passes thereby, the first Hall-effect sensor configured to produce a first one of the plurality of second signals in the form of a first magnet detection signal each time the first one of the two spaced-apart lobes passes within a detection distance of the first Hall-effect sensor and a second one of the plurality of second signals in the form of a second magnet detection signal each time the second one of the two spaced-apart lobes passes within the detection distance of the first Hall-effect sensor, and a second Hall-effect sensor mounted within the web retractor between the second magnet and the rotatable shaft and configured to detect a magnetic change when either of the two spaced-apart lobes of the rotatable shaft passes thereby, the second Hall-effect sensor spaced radially apart from the first Hall-effect sensor by second acute or obtuse angle relative to the rotational axis of the rotatable shaft, the second Hall-effect sensor configured to produce a third one of the plurality of second signals in the form of a third magnet detection signal each time the first one of the two spaced-apart lobes passes within a detection distance of the second Hall-effect sensor and a fourth one of the plurality of second signals in the form of a fourth magnet detection signal each time the second one of the two spaced-apart lobes passes within the detection distance of the second Hall-effect sensor, and wherein the instructions stored in the memory include instructions which, when executed by the processor, cause the processor to process the first, second, third and fourth magnet detection signals to determine an amount of rotation of the rotatable shaft and a direction of rotation of the rotatable shaft, and to determine that the rotatable shaft has rotated at least the threshold amount if the amount of rotation of the rotatable shaft in the direction of payout of the at least one web from the web retractor meets or exceeds the threshold amount of rotation, wherein the threshold amount of rotation of the rotatable shaft corresponds to a threshold amount of the at least one web being paid out of the web retractor.

22. The restraint system of claim 1, wherein the at least one second signal comprises a plurality of second signals, and wherein the web retractor further comprises two spaced-apart and different sized lobes each protruding radially away from the rotatable shaft, a first one of the two lobes spaced radially apart from a second one of the two lobes sensor by a first acute or obtuse angle relative to a rotational axis of the rotatable shaft, and wherein the at least one second sensor comprises a first proximity sensor mounted within the web retractor and positioned relative to the rotatable shaft to detect passage thereby of each of the two spaced-apart lobes as the rotatable shaft rotates, the first proximity sensor configured to produce a first one of the plurality of second signals in the form of a first lobe detection signal each time the first one of the two spaced-apart lobes passes within a detection distance of the first proximity sensor and a second one of the plurality of second signals in the form of a second lobe detection signal each time the second one of the two spaced-apart lobes passes within the detection distance of the first proximity sensor, and a second proximity sensor mounted within the web retractor and positioned relative to the rotatable shaft to detect passage thereby of each of the two spaced-apart lobes as the rotatable shaft rotates, the second proximity sensor spaced radially apart from the first proximity sensor by second acute or obtuse angle relative to the rotational axis of the rotatable shaft, the second proximity sensor configured to produce a third one of the plurality of second signals in the form of a third lobe detection signal each time the first one of the two spaced-apart lobes passes within a detection distance of the second proximity sensor and a fourth one of the plurality of second signals in the form of a fourth lobe detection signal each time the second one of the two spaced-apart lobes passes within the detection distance of the second proximity sensor, and wherein the instructions stored in the memory include instructions which, when executed by the processor, cause the processor to process the first, second, third and fourth lobe detection signals to determine an amount of rotation of the rotatable shaft and a direction of rotation of the rotatable shaft, and to determine that the rotatable shaft has rotated at least the threshold amount if the amount of rotation of the rotatable shaft in the direction of payout of the at least one web from the web retractor meets or exceeds the threshold amount of rotation, wherein the threshold amount of rotation of the rotatable shaft corresponds to a threshold amount of the at least one web being paid out of the web retractor.

23. A restraint system for an occupant seat mounted in a motor vehicle, the restraint system comprising:

a restraint harness having at least one web, a web retractor configured to be mounted to the occupant seat or a support surface to which the occupant seat is mounted within the motor vehicle, the web retractor having a rotatable shaft about which the at least one web is wound when retracting into the web retractor and from which the at least one web is unwound when being paid out of the web retractor, one of a tongue or buckle coupled to the at least one web, the other of the tongue or buckle configured to be mounted to one of the occupant seat or the support surface to which the occupant seat is mounted within the motor vehicle, the tongue and the buckle configured to releasably engage one another to restrain an occupant in the occupant seat with the restraint harness, a first sensor configured to produce a first signal corresponding to detection of an occupant being seated in the occupant seat, at least one second sensor operatively coupled to the web retractor and configured to produce at least one second signal corresponding to rotation of the rotatable shaft, a third sensor configured to produce a third signal corresponding to detection of engagement of the tongue with the buckle, and a processor including a memory having instructions stored therein which, when executed by the processor, cause the processor to produce at least one control signal configured to control at least one of an electronically controllable unit to disable or impede operation of the motor vehicle and a notification device to produce a notification unless, in sequence, the first sensor produces the first signal followed by the at least one second signal produced by the at least one second sensor indicating that the rotatable shaft of the web retractor has rotated by at least a threshold amount followed by the third sensor producing the third signal, wherein the at least one second signal comprises a plurality of second signals, and wherein the web retractor further comprises two differently shaped profiles defined on the rotatable shaft, a first one of the two profiles radially offset from a second one of the two profiles, a first magnet mounted within the web retractor and a second magnet mounted within the web retractor and spaced apart from the first magnet, and wherein the at least one second sensor comprises a first Hall-effect sensor mounted within the web retractor between the first magnet and the rotatable shaft and configured to detect a magnetic change when either of the two profiles of the rotatable shaft passes thereby, the first Hall-effect sensor configured to produce a first one of the plurality of second signals in the form of a first magnet detection signal each time the first one of the two profiles passes within a detection distance of the first Hall-effect sensor and a second one of the plurality of second signals in the form of a second magnet detection signal each time the second one of the two profiles passes within the detection distance of the first Hall-effect sensor, and a second Hall-effect sensor mounted within the web retractor between the second magnet and the rotatable shaft and configured to detect a magnetic change when either of the two profiles of the rotatable shaft passes thereby, the second Hall-effect sensor spaced radially apart from the first Hall-effect sensor, the second Hall-effect sensor configured to produce a third one of the plurality of second signals in the form of a third magnet detection signal each time the first one of the two profiles passes within a detection distance of the second Hall-effect sensor and a fourth one of the plurality of second signals in the form of a fourth magnet detection signal each time the second one of the two profiles passes within the detection distance of the second Hall-effect sensor, and wherein the instructions stored in the memory include instructions which, when executed by the processor, cause the processor to process the first, second, third and fourth magnet detection signals to determine an amount of rotation of the rotatable shaft and a direction of rotation of the rotatable shaft, and to determine that the rotatable shaft has rotated at least the threshold amount if the amount of rotation of the rotatable shaft in the direction of payout of the at least one web from the web retractor meets or exceeds the threshold amount of rotation, wherein the threshold amount of rotation of the rotatable shaft corresponds to a threshold amount of the at least one web being paid out of the web retractor.

24. A restraint system for an occupant seat mounted in a motor vehicle, the restraint system comprising:

a restraint harness having at least one web, a web retractor configured to be mounted to the occupant seat or a support surface to which the occupant seat is mounted within the motor vehicle, the web retractor having a rotatable shaft about which the at least one web is wound when retracting into the web retractor and from which the at least one web is unwound when being paid out of the web retractor, one of a tongue or buckle coupled to the at least one web, the other of the tongue or buckle configured to be mounted to one of the occupant seat or the support surface to which the occupant seat is mounted within the motor vehicle, the tongue and the buckle configured to releasably engage one another to restrain an occupant in the occupant seat with the restraint harness, a first sensor configured to produce a first signal corresponding to detection of an occupant being seated in the occupant seat, at least one second sensor operatively coupled to the web retractor and configured to produce at least one second signal corresponding to rotation of the rotatable shaft, a third sensor configured to produce a third signal corresponding to detection of engagement of the tongue with the buckle, and a processor including a memory having instructions stored therein which, when executed by the processor, cause the processor to produce at least one control signal configured to control at least one of an electronically controllable unit to disable or impede operation of the motor vehicle and a notification device to produce a notification unless, in sequence, the first sensor produces the first signal followed by the at least one second signal produced by the at least one second sensor indicating that the rotatable shaft of the web retractor has rotated by at least a threshold amount followed by the third sensor producing the third signal, wherein the instructions stored in the memory further include instructions which, when executed by the processor, cause the processor to, following the sequential occurrence of the first sensor producing the first signal, the at least one second signal produced by the at least one second sensor indicating that the rotatable shaft of the web retractor has rotated by at least a threshold amount and the third sensor producing the third signal, (i) monitor the at least one second signal, (ii) produce the at least one control signal if the at least one second signal indicates that the rotatable shaft of the web retractor has not rotated at least an incremental amount within a predefined time period, and (iii) continually repeat (i) and (ii).

\* \* \* \* \*